(12) United States Patent
Mihara et al.

(10) Patent No.: US 10,021,244 B2
(45) Date of Patent: Jul. 10, 2018

(54) INFORMATION PROCESSING TERMINAL, INFORMATION PROCESSING METHOD, AND PROGRAM

(71) Applicants: Akihiro Mihara, Tokyo (JP); Yoshiko Aono, Kanagawa (JP)

(72) Inventors: Akihiro Mihara, Tokyo (JP); Yoshiko Aono, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 43 days.

(21) Appl. No.: 14/762,685

(22) PCT Filed: Jan. 24, 2014

(86) PCT No.: PCT/JP2014/052179
§ 371 (c)(1),
(2) Date: Jul. 22, 2015

(87) PCT Pub. No.: WO2014/119700
PCT Pub. Date: Aug. 7, 2014

(65) Prior Publication Data
US 2015/0365526 A1    Dec. 17, 2015

(30) Foreign Application Priority Data
Jan. 30, 2013    (JP) .................................. 2013-015919

(51) Int. Cl.
*G06F 13/00*    (2006.01)
*G06F 3/0482*    (2013.01)
(Continued)

(52) U.S. Cl.
CPC ...... *H04M 3/42365* (2013.01); *G06F 3/0481* (2013.01); *G06F 3/0482* (2013.01);
(Continued)

(58) Field of Classification Search
CPC ....... H04M 3/42365; H04M 1/274525; H04M 1/247; H04M 3/56; H04M 3/563;
(Continued)

(56) References Cited

U.S. PATENT DOCUMENTS

| 5,648,781 A * | 7/1997 | Choi | ...................... H03J 1/0025 340/12.54 |
| 7,154,473 B2 * | 12/2006 | Kim | ..................... G06F 3/04812 345/157 |

(Continued)

FOREIGN PATENT DOCUMENTS

| JP | 2003-281068 | 10/2003 |
| JP | 2007-179330 | 7/2007 |

(Continued)

OTHER PUBLICATIONS

Extended Search Report dated Jan. 5, 2016 in European Patent Application No. 14746029.9.

(Continued)

*Primary Examiner* — Benyam Ketema
(74) *Attorney, Agent, or Firm* — Oblon, McClelland, Maier & Neustadt, L.L.P.

(57) ABSTRACT

A terminal is disclosed including a receiving unit receiving list data specifying destination terminals with which the terminal initiates communications and status data representing statuses of the destination terminals; a creation unit creating a list to display identifiers of the destination terminals using the data, wherein a sequence in which the identifiers are arranged in the list is updated; and a display unit displaying the list including identifiers of the destination terminals and a cursor to select the identifier; wherein the display unit selects one of modes depending on whether one of the identifiers at a position is pointed to by the cursor in response to a user operation, and in one mode, the display unit maintains the cursor at the position despite a change in (Continued)

a position of the selected identifier resulting from the update, and in another mode, the display unit moves the cursor to a new position.

7 Claims, 18 Drawing Sheets

(51) Int. Cl.
    *H04M 3/42*     (2006.01)
    *H04M 3/56*     (2006.01)
    *G06F 3/0481*     (2013.01)
    *H04M 1/247*     (2006.01)
    *H04M 1/2745*     (2006.01)
    *H04M 19/04*     (2006.01)
    *G06F 3/0485*     (2013.01)

(52) U.S. Cl.
    CPC ............ *G06F 3/0485* (2013.01); *G06F 13/00* (2013.01); *H04M 1/247* (2013.01); *H04M 1/274525* (2013.01); *H04M 3/56* (2013.01); *H04M 3/563* (2013.01); *H04M 3/567* (2013.01); *H04M 19/04* (2013.01)

(58) Field of Classification Search
    CPC ..... H04M 3/567; H04M 19/04; G06F 3/0481; G06F 3/0482; G06F 3/0485; G06F 13/00
    USPC .......................................................... 345/156
    See application file for complete search history.

(56) References Cited

U.S. PATENT DOCUMENTS

| | | | |
|---|---|---|---|
| 8,769,001 B2 | 7/2014 | Ohwada | |
| 9,553,862 B2* | 1/2017 | Tamura | H04L 63/08 |
| 2003/0156698 A1* | 8/2003 | Creamer | H04M 3/382 |
| | | | 379/207.01 |
| 2005/0044167 A1* | 2/2005 | Kobayashi | G06Q 10/10 |
| | | | 709/217 |
| 2007/0168425 A1* | 7/2007 | Morotomi | H04M 1/72522 |
| | | | 709/204 |
| 2008/0291896 A1 | 11/2008 | Tuubel et al. | |
| 2011/0219060 A1* | 9/2011 | Ohwada | G06F 15/16 |
| | | | 709/203 |
| 2012/0139836 A1* | 6/2012 | Naito | G06F 3/038 |
| | | | 345/157 |
| 2012/0140022 A1* | 6/2012 | Kato | H04N 7/15 |
| | | | 348/14.08 |
| 2013/0117373 A1* | 5/2013 | Umehara | H04M 3/42374 |
| | | | 709/204 |
| 2014/0033247 A1* | 1/2014 | Wingert | H04N 7/1675 |
| | | | 725/31 |
| 2014/0033274 A1* | 1/2014 | Okuyama | H04L 63/10 |
| | | | 726/3 |
| 2014/0223367 A1* | 8/2014 | Hatada | G06F 3/04842 |
| | | | 715/810 |

FOREIGN PATENT DOCUMENTS

| | | |
|---|---|---|
| JP | 2008-263540 | 10/2008 |
| JP | 4368092 | 11/2009 |
| JP | 2010-009273 | 1/2010 |
| JP | 2010-033537 | 2/2010 |
| JP | 2010-523035 | 7/2010 |
| JP | 2010-257368 | 11/2010 |
| JP | 2011-205612 | 10/2011 |
| JP | 2012-054646 | 3/2012 |
| JP | 2014-027433 | 2/2014 |
| WO | WO 2012/014824 A1 | 2/2012 |

OTHER PUBLICATIONS

International Search Report dated Apr. 28, 2014 in PCT/JP2014/052179 filed on Jan. 24, 2014.

* cited by examiner

FIG.7A

| DISPLAY CONTROL FLAG | DC1 |

FIG.7B

| DISPLAY CONTROL FLAG | 01ab |

FIG.8

| TERMINAL ID | PASSWORD |
|---|---|
| 01aa | aaaa |
| 01ab | abab |
| 01ba | baba |
| ... | ... |

FIG.9

| SOURCE TERMINAL ID | DESTINATION TERMINAL ID |
|---|---|
| 01aa | 01ab,01ba,01db,01dc,01ca,01cb |
| 01ab | 01aa,01ca,01cb |
| 01ba | 01aa,01ab,01ca,01cb,01da,01db |
| 01cb | 01db |
| ... | ... |
| 01db | 01aa,01ab,01ba,・・・,01da,01ca,01cb,・・・,01da |

FIG.10

| TERMINAL ID | TERMINAL NAME | TERMINAL STATUS | RECEIVED DATE AND TIME | TERMINAL IP ADDRESS |
|---|---|---|---|---|
| 01aa | JAPAN TOKYO OFFICE AA TERMINAL | ONLINE (DURING MEETING) | 11/10/2009, 1:40 PM | 1.2.1.3 |
| 01ab | JAPAN TOKYO OFFICE AB TERMINAL | OFFLINE | 11/9/2009, NOON | 1.2.1.4 |
| ... | ... | ... | ... | ... |
| 01ba | JAPAN OSAKA OFFICE BA TERMINAL | ONLINE (AVAILABLE) | 11/10/2009, 1:45 PM | 1.2.2.3 |
| 01bb | JAPAN OSAKA OFFICE BB TERMINAL | ONLINE (AVAILABLE) | 11/10/2009, 1:50 PM | 1.2.2.4 |
| ... | ... | ... | ... | ... |
| 01ca | U.S. NEW YORK OFFICE CA TERMINAL | OFFLINE | 11/10/2009, 0:45 PM | 1.3.1.3 |
| 01cb | U.S. NEW YORK OFFICE CB TERMINAL | OFFLINE | 11/10/2009, 1:55 PM | 1.3.1.4 |
| ... | ... | ... | ... | ... |
| 01da | U.S. WASHINGTON OFFICE DA TERMINAL | OFFLINE | 11/8/2009, 0:45 PM | 1.3.2.3 |
| 01db | U.S. WASHINGTON OFFICE DB TERMINAL | ONLINE (DURING MEETING) | 11/10/2009, 0:45 PM | 1.3.2.4 |
| ... | ... | ... | ... | ... |

FIG.11
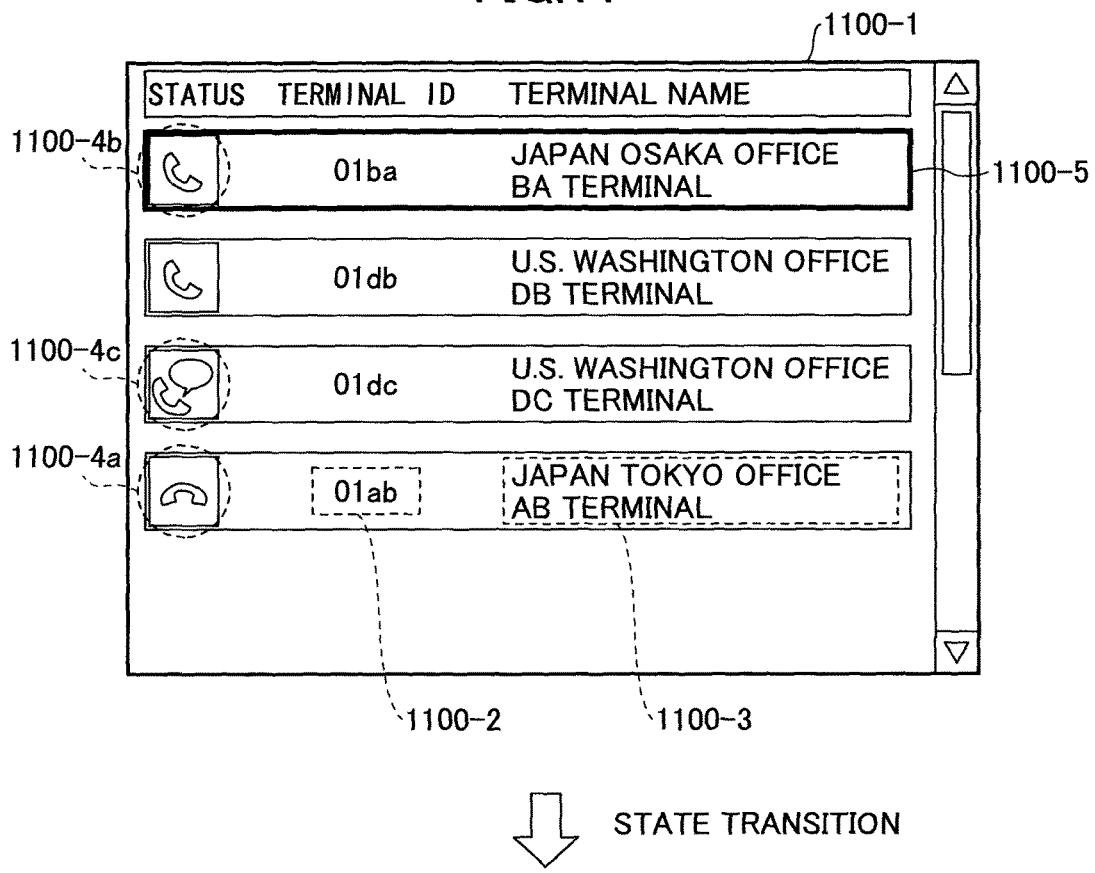
STATE TRANSITION
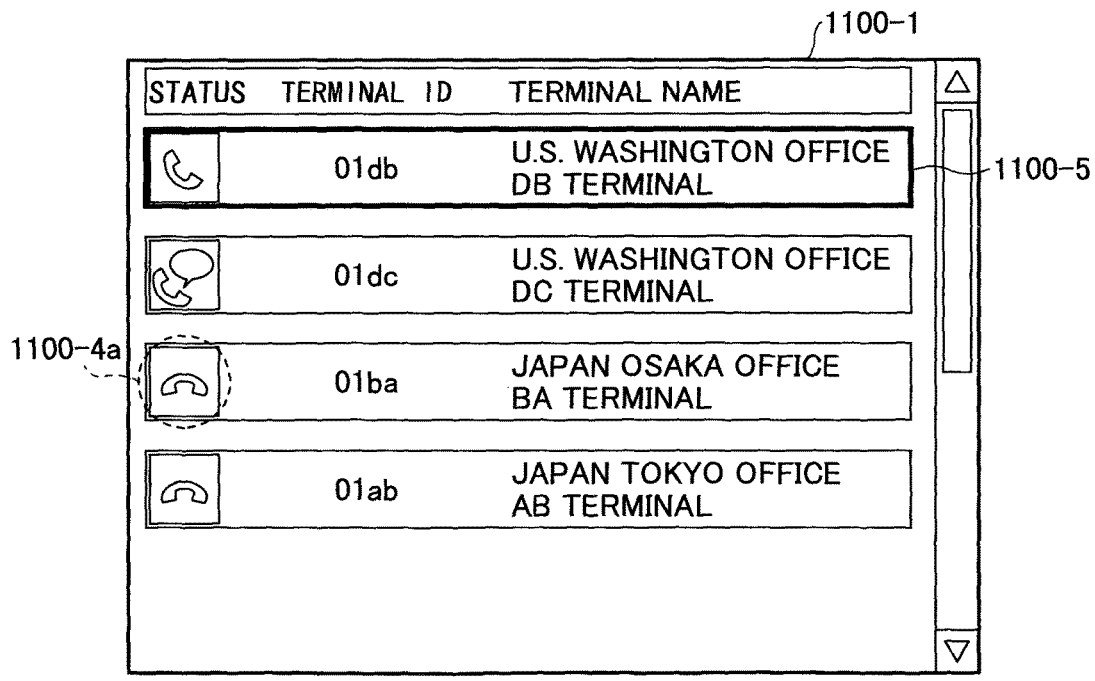

FIG.12

| STATUS | TERMINAL ID | TERMINAL NAME |
|---|---|---|
| 📞 | 01ba | JAPAN OSAKA OFFICE BA TERMINAL |
| 📞 | 01db | U.S. WASHINGTON OFFICE DB TERMINAL |
| 📞💬 | 01dc | U.S. WASHINGTON OFFICE DC TERMINAL |
| 📞 | 01ab | JAPAN TOKYO OFFICE AB TERMINAL |

⇩ STATE TRANSITION

| STATUS | TERMINAL ID | TERMINAL NAME |
|---|---|---|
| 📞 | 01db | U.S. WASHINGTON OFFICE DB TERMINAL |
| 📞💬 | 01dc | U.S. WASHINGTON OFFICE DC TERMINAL |
| 📞 | 01ba | JAPAN OSAKA OFFICE BA TERMINAL |
| 📞 | 01ab | JAPAN TOKYO OFFICE AB TERMINAL |

FIG.13

| STATUS | TERMINAL ID | TERMINAL NAME |
|---|---|---|
| ☏ | 01ba | JAPAN OSAKA OFFICE BA TERMINAL |
| ☏ | 01db | U.S. WASHINGTON OFFICE DB TERMINAL |
| ☏💬 | 01dc | U.S. WASHINGTON OFFICE DC TERMINAL |
| ☏ | 01ab | JAPAN TOKYO OFFICE AB TERMINAL |

1100-1, 1100-5

⬇ CURSOR IS MOVED

| STATUS | TERMINAL ID | TERMINAL NAME |
|---|---|---|
| ☏ | 01ba | JAPAN OSAKA OFFICE BA TERMINAL |
| ☏ | 01db | U.S. WASHINGTON OFFICE DB TERMINAL |
| ☏💬 | 01dc | U.S. WASHINGTON OFFICE DC TERMINAL |
| ☏ | 01ab | JAPAN TOKYO OFFICE AB TERMINAL |

| STATUS | TERMINAL ID | TERMINAL NAME |
|---|---|---|
| ☎ | 01ca | U.S. NEW YORK OFFICE CA TERMINAL |
| ☎ | 01cb | U.S. NEW YORK OFFICE CB TERMINAL |

⇩ STATE TRANSITION

| STATUS | TERMINAL ID | TERMINAL NAME |
|---|---|---|
| ☎ | 01cb | U.S. NEW YORK OFFICE CB TERMINAL |
| ☎ | 01dc | U.S. WASHINGTON OFFICE DC TERMINAL |
| ☎ | 01ab | JAPAN TOKYO OFFICE AB TERMINAL |
| ☎ | 01ca | U.S. NEW YORK OFFICE CA TERMINAL |

FIG.15

| STATUS | TERMINAL ID | TERMINAL NAME |
|---|---|---|
| ☎ | 01ba | JAPAN OSAKA OFFICE BA TERMINAL |
| ☎ | 01db | U.S. WASHINGTON OFFICE DB TERMINAL |
| 💬 | 01ab | JAPAN TOKYO OFFICE AB TERMINAL |
| 💬 | 01dc | U.S. WASHINGTON OFFICE DC TERMINAL |

⇩ STATE TRANSITION

| STATUS | TERMINAL ID | TERMINAL NAME |
|---|---|---|
| 💬 | 01dc | U.S. WASHINGTON OFFICE DC TERMINAL |
| 💬 | 01ca | U.S. NEW YORK OFFICE CA TERMINAL |
| 💬 | 01cb | U.S. NEW YORK OFFICE CB TERMINAL |
| ☎ | 01db | U.S. WASHINGTON OFFICE DB TERMINAL |

FIG.16

| STATUS | TERMINAL ID | TERMINAL NAME |
|---|---|---|
| 📞 | 01ba | JAPAN OSAKA OFFICE BA TERMINAL |
| 📞 | 01db | U.S. WASHINGTON OFFICE DB TERMINAL |
| 💬📞 | 01dc | U.S. WASHINGTON OFFICE DC TERMINAL |
| 📴 | 01ab | JAPAN TOKYO OFFICE AB TERMINAL |

⇩ STATE TRANSITION

| STATUS | TERMINAL ID | TERMINAL NAME |
|---|---|---|
| 📞 | 01db | U.S. WASHINGTON OFFICE DB TERMINAL |
| 💬📞 | 01ba | JAPAN OSAKA OFFICE BA TERMINAL |
| 💬📞 | 01dc | U.S. WASHINGTON OFFICE DC TERMINAL |
| 📴 | 01ab | JAPAN TOKYO OFFICE AB TERMINAL |

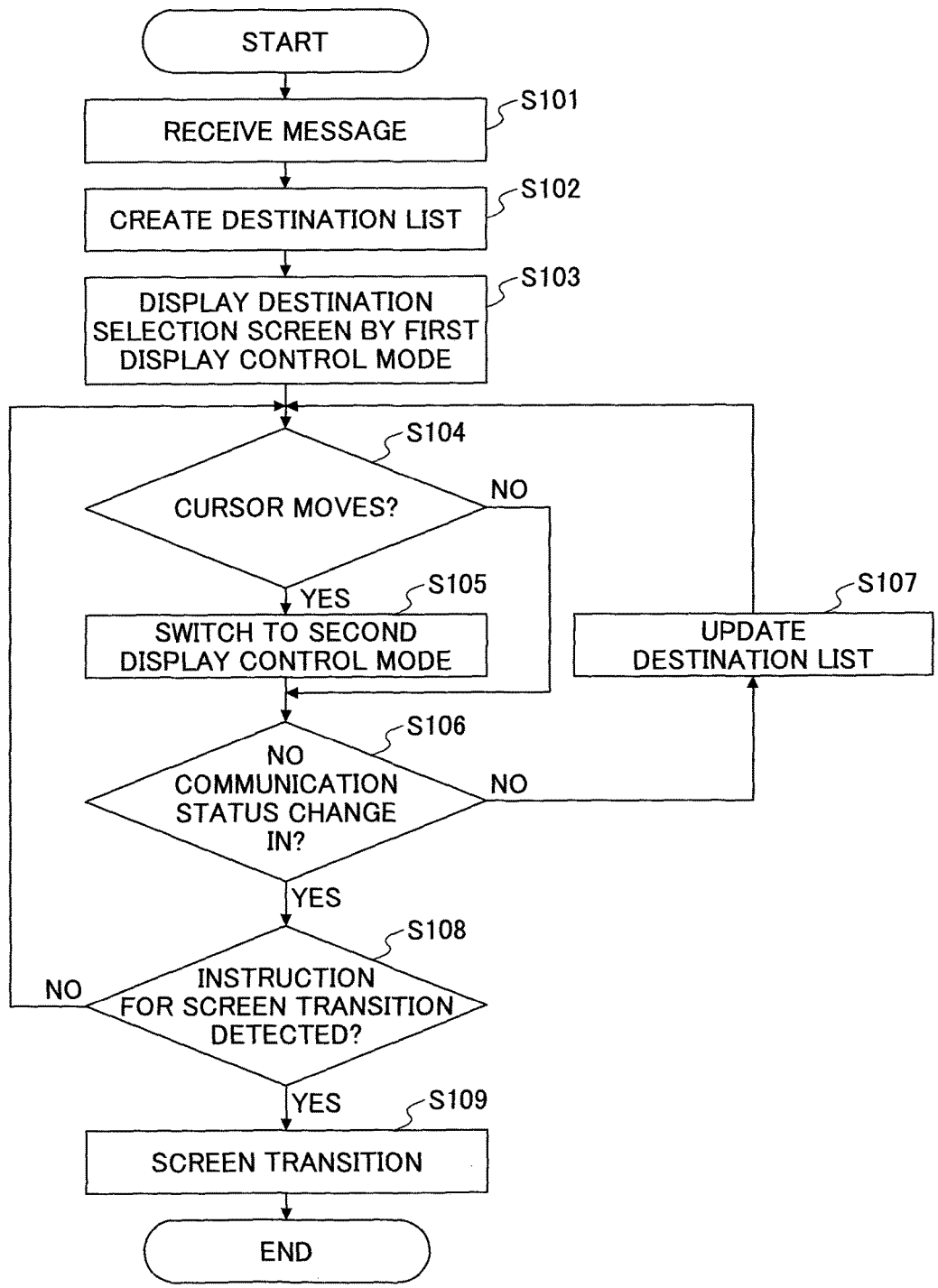

US 10,021,244 B2

INFORMATION PROCESSING TERMINAL, INFORMATION PROCESSING METHOD, AND PROGRAM

TECHNICAL FIELD

An aspect of this disclosure is related to an information processing terminal, an information processing method, and a program.

BACKGROUND ART

Recently, a conference system has become increasingly popular, which enables a remote conference between different locations. In the remote conference system, a communication terminal obtains and collects images and sounds by shooting an attendee and recording his voice, converts the collected analog data into digital data, and transmits them to another party's terminal. The remote conference system can create, by displaying the image of one attendee on a display such as a video screen in a conference room of another attendee, an atmosphere as if the attendee is in a meeting room and talks with the other attendee.

In addition, the remote conference system knows a state of a candidate terminal before starting the conference by transmitting status information representing whether the candidate terminal is online or not to a terminal which has transmitted a start request for the conference. Because the terminal may know that the destination terminal is offline and cannot respond after the transmission of the start request, it may be prevented that the start request for the conference becomes a useless procedure.

In addition, a technology is known to automatically align destination candidates so that an online terminal is positioned at the top of a list and an offline terminal is listed at the bottom of the list (e.g. Patent Document 1).

When a communication status of the destination candidate changes while displaying a destination selection screen, a conventional communication terminal for the remote conference may employ one of the following display control methods:

(1) Position Fixed—selected position is fixed (pointed position with a cursor is fixed) and (2) Keep Selected—the destination candidate is kept selected (pointed position moves depending on changes of the display positions of the destination candidates).

The above two methods both have issues. In the position fixed method, since the selected position is fixed, once the display positions of the destination candidates are changed, the selected terminal may be changed. Thus, it is inconvenient when the user desires to confirm a communication status of a specific destination candidate.

In the keep selected method, the selected position may be changed depending on a change of display position of the destination candidate which has been selected at first. Thus, it is inconvenient when the user desires to sort the list by online status of the destination candidates.

SUMMARY OF INVENTION

In one aspect, the present disclosure provides an information processing terminal, an information processing method, and a recording medium which substantially eliminate one or more problems caused by the limitations and disadvantages of the related art.

In an aspect of this disclosure, there is provided an information processing terminal including a receiving unit configured to receive a destination list data specifying one or more destination terminals with which the information processing terminal is operable to initiate communications and to receive status data representing communication statuses of the destination terminals; a creation unit configured to create a destination list to display identifiers of the destination terminals using the destination list data and the status data, wherein a sequence in which the identifiers are arranged in the destination list is updated when one of the communication statuses is updated; and a display control unit configured to display the destination list including the identifiers and a cursor to select one of the identifiers; wherein the display control unit selects one of a first mode and a second mode depending on whether one of the identifiers at a position on the destination list is pointed to by the cursor in response to a user operation to select the one of the identifiers, and wherein in the first mode, the display control unit maintains the cursor at the position despite a change in a position of the selected one of the identifiers resulting from the sequence update, and in the second mode, the display control unit moves the cursor from the position to a new position at which the selected one of the identifiers is placed on the sequence update.

According to another embodiment of this invention, there is provided an information processing method executed by an information processing terminal, the information processing method including receiving a destination list data specifying one or more destination terminals with which the information processing terminal is operable to initiate communications and receiving status data representing communication statuses of the destination terminals; creating a destination list to display identifiers of the destination terminals using the destination list data and the status data, wherein a sequence in which the identifiers are arranged in the destination list is updated when one of the communication statuses is updated; displaying the destination list including the identifiers and a cursor to select one of the identifiers; and selecting one of a first mode and a second mode depending on whether one of the identifiers at a position on the destination list is pointed to by the cursor in response to a user operation to select the one of the identifiers; and wherein in the first mode, the cursor at the position is maintained despite a change in a position of the selected one of the identifiers resulting from the sequence update, and in the second mode, the cursor is moved from the position to a new position at which the selected one of the identifiers is placed on the sequence update.

According to another embodiment of this invention, there is provided a program for causing an information processing terminal to perform a method including receiving a destination list data specifying one or more destination terminals with which the information processing terminal is operable to initiate communications and receiving status data representing communication statuses of the destination terminals; creating a destination list to display identifiers of the destination terminals using the destination list data and the status data, wherein a sequence in which the identifiers are arranged in the destination list is updated when one of the communication statuses is updated; displaying the destination list including the identifiers and a cursor to select one of the identifiers; and selecting one of a first mode and a second mode whether one of the identifiers at a position on the destination list is pointed to by the cursor in response to a user operation to select the one of the identifiers; and wherein in the first mode, the cursor at the position is maintained despite a change in a position of the selected one of the identifiers resulting from the sequence update, and in the second mode, the cursor is moved from the position to a new position at which the selected one of the identifiers is placed on the sequence update.

BRIEF DESCRIPTION OF DRAWINGS

FIGS. 7A, 7B are drawings illustrating an example of a display control flag.

FIG. 8 is a drawing illustrating an example of a terminal authentication management table.

FIG. 9 is a drawing illustrating an example of destination list management table.

FIG. 10 is a drawing illustrating an example of a terminal management table.

FIG. 11 is a drawing illustrating a screen transition according to a first display control method.

FIG. 12 is a drawing illustrating a screen transition according to a second display control method.

FIG. 13 is a drawing illustrating an example of a movement of a cursor.

FIG. 14 is a drawing illustrating a screen transition according to a first example.

FIG. 15 is a drawing illustrating a screen transition according to a second example.

FIG. 16 is a drawing illustrating a screen transition according to a third example.

FIG. 19 is a flowchart illustrating an example of information processing for a transmission terminal.

DESCRIPTION OF EMBODIMENTS

In the following, a description will be given of an information processing terminal, an information processing method, and a recording medium according to an embodiment of the present invention with reference to the accompanying drawings.

Embodiment

Figure 1:
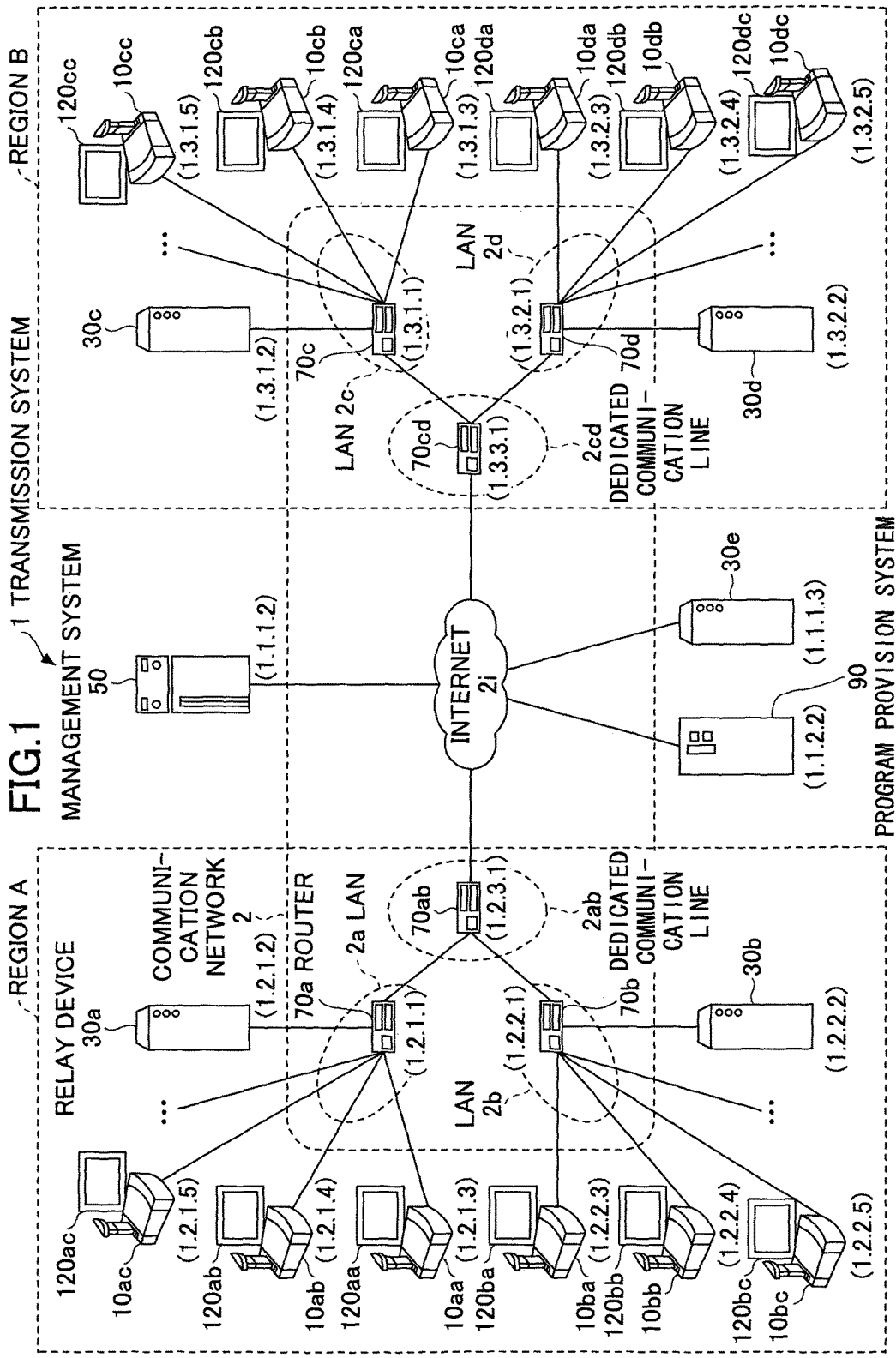
FIG. 1 is a schematic diagram showing a transmission system according to an embodiment.

With reference to the accompanying drawings, a communication, system and a program stored on the recording medium are discussed according to this embodiment. FIG. 1 is a block diagram showing a communication system and a program according to an embodiment.

With reference to FIGS. 1-19, an embodiment of the communication system and the program is explained in detail. FIG. 1 is a schematic diagram showing a transmission system as the communication system. First, an overview of the embodiment is explained with reference to FIG. 1.

The transmission system 1 includes a data provision system which transfers content data from a transmission terminal to another transmission terminal via a transmission management system in a single direction. In addition, the transmission management system includes a communicating system which communicates information and emotion between transmission terminals via the transmission management system.

This communicating system is used to communicate information and emotion between communicating terminals (corresponding to the transmission terminals) via a communication management system (corresponding to the transmission management system). An example of the communication system is a television conference system, a television telephone system, a voice conference system, a telephone system, a PC screen sharing system, a white board sharing system, and a text chat system.

In this embodiment, the television conference system is used as an example of the communicating system, a television conference management system is used as an example of the communicating management system, and a television conference terminal is used as an example of the communicating terminal.

In the following, the transmission system 1 is explained as the television conference system, the transmitting management system 50 is explained as the television conference management system, and the transmission terminal 10 is explained as the television conference terminal. Thus, the communication system in the embodiment may be applied to the communicating system and the transmission system in addition to the television conference system.

As shown in FIG. 1, the transmission system 1 includes two or more transmission terminals (10aa, 10ab, ...), two or more displays (120aa, 120ab, ...) for the respective transmission terminals (10aa, 10ab, ...), two or more relay devices (30a, 30b, 30c, 30d), a transmission management system 50, and a program provision system 90. In the following, "the transmission terminals" may be just called "terminals", and "the transmission management system" may be called a "management system".

Note that, in the following, any one of the transmission terminals (10aa, 10ab, ...) may be called a transmission terminal 10, any one of the displays (120aa, 120ab, ...) may be called a display 120, and any one of the relay devices (30a, 30b, 30c, 30d) may be called a relay device 30.

The transmission terminal 10 may transmit to and receive from other devices various types of data. For example, the transmission terminal 10 may establish a session with another terminal 10 and perform communication by transmitting or receiving content data including voice data and image data in the session. In this way, a television conference between the terminals may be established.

In the following, "image data and voice data" are simply called the "content data". Note that, the content data transmitted by the terminals 10 is not limited to those examples. For example, the content data may include text data. In addition, the content data may include text data in addition to the voice data and the image data. Furthermore, the image data may be motion data or still image data. Also, the image data may include both of the motion data and the still image data.

When the television conference is started in the transmission system 1 according to the embodiment, a user who desires to start the conference operates the terminal 10, and the operated terminal 10 transmits a start request message to the management system 50.

Here, the start request message may be used to start a session for the television conference. The start request message includes data specifying a terminal 10 as another party for the session. In the following, the terminal 10 which transmits the start request message is also called a start requesting terminal. In addition, the terminal as the other party is simply called a destination terminal or just a destination.

One or more destination terminals may be specified for the session. Thus, in the transmission system 1, the sessions established between not only two but three or more terminals may be used to establish a television conference.

Other users may join a television conference whose session has been established and which has started in the transmission system according to the embodiment. In response to an operation to a terminal 10 by a user who desires to join the conference, the operated terminal 10 may transmit a join request message which identifies the established session (hereinafter called the established session) used by the desired television conference to the management system 50. In the following, the terminal 10 which transmits the join request message is called the join requesting terminal.

The management system 50 manages the terminals 10 and the relay devices 30 in an integrated fashion. The management system 50 establishes the sessions for the terminals 10 and manages the television conference using voice, etc., between the terminals 10.

When the management system 50 receives a start request message for a session from a terminal 10, the management system 50 establishes the session between the terminal 10 transmitting the start request message and the destination terminal and causes them to start a television conference. When the management system 50 receives from a terminal 10 a join request message for the session which has been established (hereinafter called the established session), the management system 50 causes the terminal 10 to join the established session.

In the transmission system 1 shown in FIG. 1, routers (70a, 70b, 70c, 70d, 70ab, 70cd) are configured to select the optimal paths for the content data. Note that, in the following, any one of the routers (70a, 70b, 70c, 70d, 70ab, 70cd) may be simply called a router 70. The relay devices 30 are configured to relay the content data between the terminals 10.

The program provision system 90 includes a hard disk (HD) (not shown) configured to store programs for the terminals 10, with which the terminal 10 may implement various functions or various processes. The program provision system 90 may transmit the programs for terminals to the terminal 10.

The HD of the program provision system 90 further stores programs for the relay device 30, with which the relay device 30 may implement various functions or various processes. The program provision system 90 may transmit the programs for the relay device 30 to the relay device 30.

In addition, the HD of the program provision system 90 further stores programs for the management system 50, with which the management system 50 may implement various functions or various processes. The program provision system 90 may transmit the programs for the management system 50 to the management system 50.

The terminals (10aa, 10ab . . . ) the relay device 30a and the router 70a are connected via a LAN 2a so that they may communicate with one another. The terminals (10ba, 10bb . . . ) the relay device 30b and the router 70b are connected via a LAN 2b so that they may communicate with one another. The LAN 2a and the LAN 2b are set up in a predetermined region A. For example, the region A corresponds to Japan, the LAN 2a is configured in a Tokyo office, and the LAN 2b is configured in an Osaka office.

On the other hand, the terminals (10caa, 10cb . . . ) the relay device 30c and the router 70c are connected via a LAN 2c so that they may communicate with one another. The terminals (10da, 10db . . . ) the relay device 30d, and the router 70d are connected via a LAN 2d so that they may communicate with one another. The LAN 2c and the LAN 2d are set up in a predetermined region B. For example, the region B corresponds to the U.S., the LAN 2c is configured in a New York office, and the LAN 2d is configured in a Washington D.C. office. The region A and the region B are connected with the routers (70ab, 70cd) via the Internet so that they may communicate with one another.

The management system 50 and the program provision system 90 are connected to the terminal 10 and the relay device 30 via the Internet 2i so that they may communicate with one another. The management system 50 and the program provision system 90 may be installed in the region A or the region B, or may be installed in a region other than the region A and B.

The relay device 30e is connected to the terminal 10 via the Internet 2 so that they may communicate with one another. The relay device 30e always works and is located in a region other than the region A and B in order to avoid receiving effects of local traffic in the region A or B.

When a terminal 10 calls another terminal 10 in another local area, the relay device 30e is used as the relay device relaying their content data. In a single local area communication, when the relay device 30e does not work in the local area, the relay device 30e is used as the relay device for emergency.

In this embodiment, a communication network 2 may include the LAN 2a, the LAN 2b, a dedicated communication line 2ab, the Internet 2i, a dedicated communication line 2cd, the LAN 2c and the LAN 2d. The communication network 2 may include wired and wireless communication networks.

In FIG. 1, the set of four numerals attached beneath or over each of the terminal 10, the relay device 30, the management system 50, the router 70, and the program provision system 90 simply designates the IP address of the typical IPv4. For example, the IP address of the terminal 10aa is "1.2.1.3", as shown in FIG. 1. The IP address may be the IPv6; however, in this embodiment, the IPv4 is used for the sake of simplifying the illustration.

Figure 2:
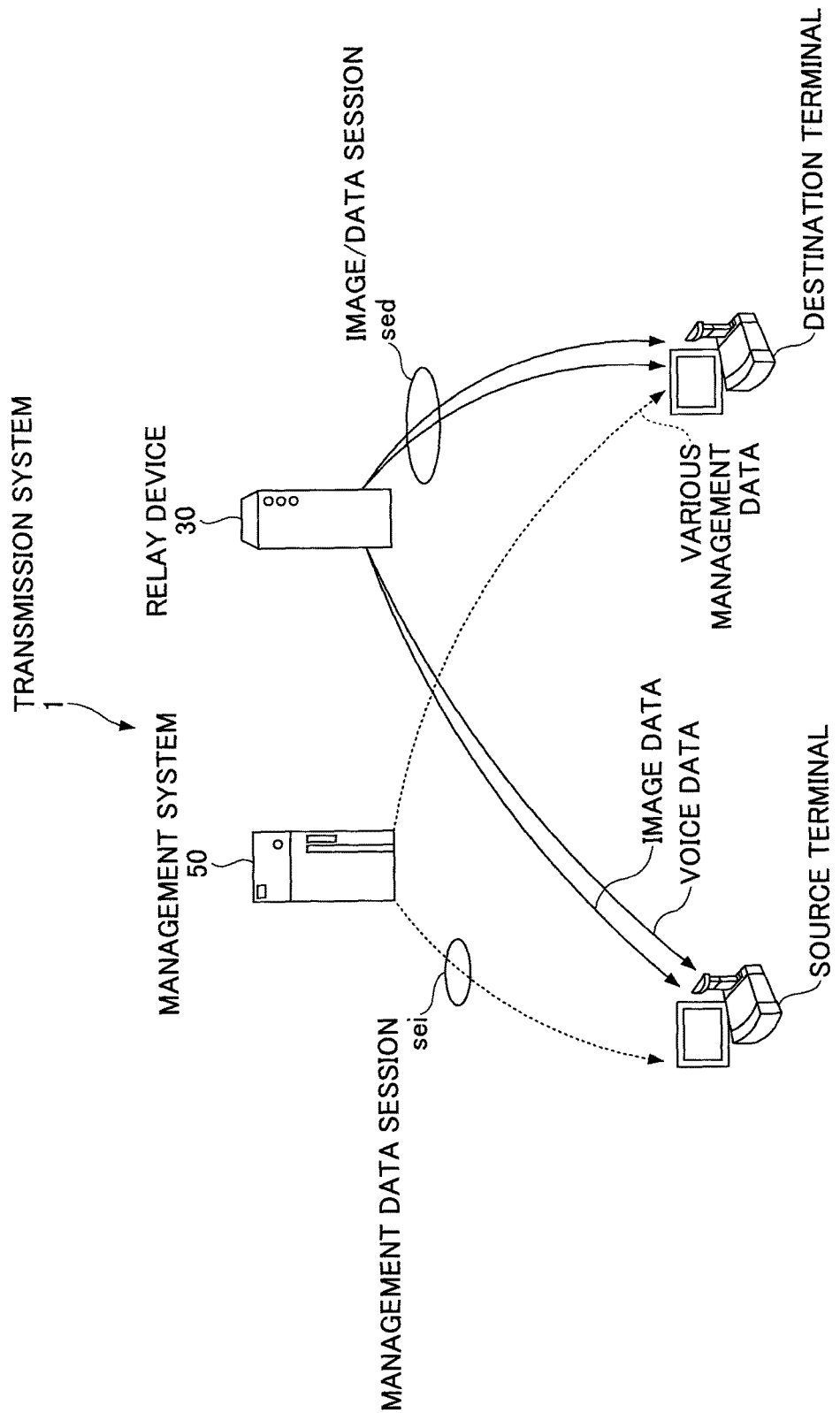
FIG. 2 is a conceptual diagram showing sessions of transmitting and receiving of image data, voice data and management data in the transmission system according to the embodiment.

FIG. 2 is a conceptual diagram showing sessions of transmitting and receiving of image data, voice data and management data in the transmission system 1 according to the embodiment. As shown in FIG. 2, in the transmission system 1, a management data session sei is established between the request source terminal and the destination terminal via the management system 50 for transmitting and receiving various management data.

In addition, between the transmission terminals in which the management data session sei is established, two sessions for image data and voice data are established via the relay device 30. The two sessions are called "image/data session sed". Here, the image data may be transmitted in different image data sets with various resolutions.

[Hardware Configuration of Embodiment]

Figure 3:
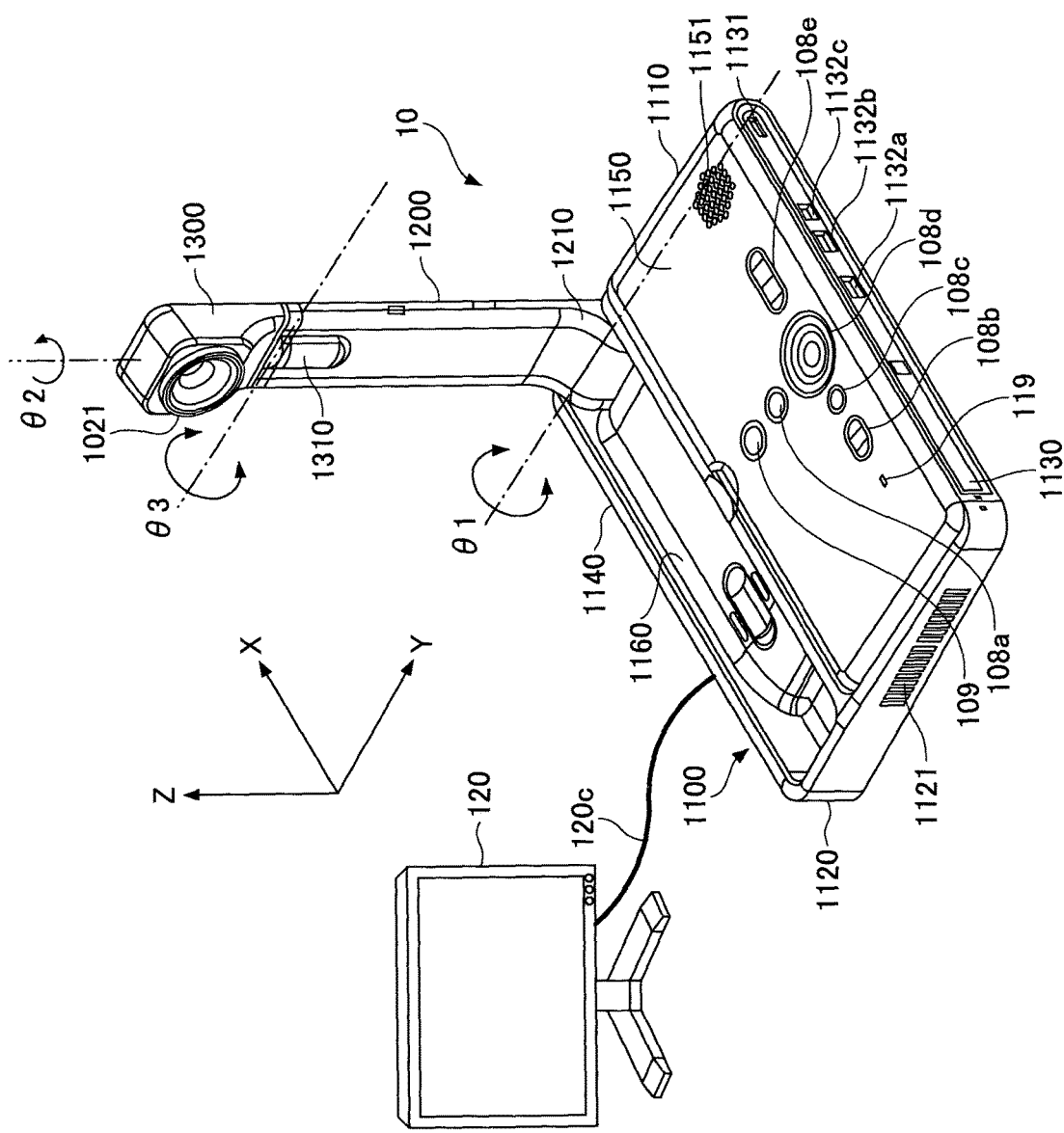
FIG. 3 is a perspective view of a terminal according to the embodiment.

Next, the hardware configuration of the embodiment will be described. FIG. 3 is a perspective view of the terminal 10 according to the embodiment. In the following, an X-axis direction represents a longitudinal direction of the terminal 10, a Y-axis direction represents a direction perpendicular to the X-axis direction in a horizontal plane, and a Z-axis direction represents a direction perpendicular to the X-axis direction and the Y-axis direction (i.e., vertical direction).

As shown in FIG. 3, the terminal 10 includes a housing 1100, an arm 1200, and a camera housing 1300. A front wall face 1110 of the housing 1100 includes a not-illustrated air intake face which is formed with two or more air intake holes, and a rear wall face 1120 of the housing 1100 includes an exhaust face 1121 which is formed with two or more exhaust holes.

Accordingly, by driving a cooling fan arranged in the housing 1100, the terminal 10 can take in external air behind the terminal 10 via the air intake face and exhaust the air inside the terminal 10 via the exhaust face 1121. A right-side wall face 1130 of the housing 1100 is formed with a voice-collecting hole 1131, via which a built-in microphone 114 (explained later) can pick up audio sound, such as voice, sound, or noise.

The right-side wall face 1130 of the housing 1100 includes an operation panel 1150. This operation panel 1150 includes operation buttons (108a-108e), a power switch 109, an alarm lamp 119 (explained later), and a voice output face 1151. The voice output face 1151 is formed with voice output holes for outputting voice from a built-in speaker 115 (explained later). Further, a left-side wall face 1140 of the housing 1100 includes an accommodation unit 1160 which is a recessed seating unit for accommodating the arm 1200 and the camera housing 1300. The right-side wall face 1130 of the housing 1100 further includes connection ports (1132a-1132c) for electrically connecting a cable to an external device connection interface (IF) 118 (explained later). On the other hand, the left-side wall face 1140 of the housing 1100 includes a not-illustrated connection port for electrically connecting a cable 120c of the display 120 to the external device connection interface (IF) 118.

Note that, in the following, any one of the operation buttons (108a-108e) may be called an operation button 108, and any one of the connection ports (1132a-1132c) may be called a connection port 1132.

Next, the arm 1200 is attached to the housing 1100 via a torque hinge 1210 such that the arm 1200 is movable in upward and downward directions within a range of tilt angle θ1 of 135 degrees with respect to the housing 1100. The arm 1200 shown in FIG. 3 is in a state where the tilt angle θ1 is 90 degrees.

The camera housing 1300 includes a built-in camera 1021, and the camera 1021 is configured to take images of a user, documents, a room, etc. The camera housing 1300 further includes a torque hinge 1310. The camera housing 1300 is attached to the arm 1200 via the torque hinge 1310. The camera housing 1300 is rotationally attached to the arm 1200 in upward and downward directions via the torque hinge 1310 such that the camera housing 1300 is movable in the up, down, right and left directions in a range of pan angle θ2 of ±180 degrees and in a range of tilt angle θ3 of ±45 degrees when the pan angle and the tilt angle in the state shown in FIG. 3 are 0 degrees.

Alternatively, the terminal 10 may be a computer which is generally used. When the computer used as the terminal does not have a microphone or a camera, an external microphone or camera may be connected. In this way, the computer may be used as the terminal 10 according to the embodiment.

When the computer is used as the terminal 10, applications for processes (explained later) to be executed by the terminal 10 are installed in advance. Thus, the terminal 10 may be called an information processing terminal including the terminal 10 shown in FIG. 3 and the computer.

Perspective views of the relay device 30, the management system 50, and the program provision system 90 are identical to a common computer used as a server.

Figure 4:
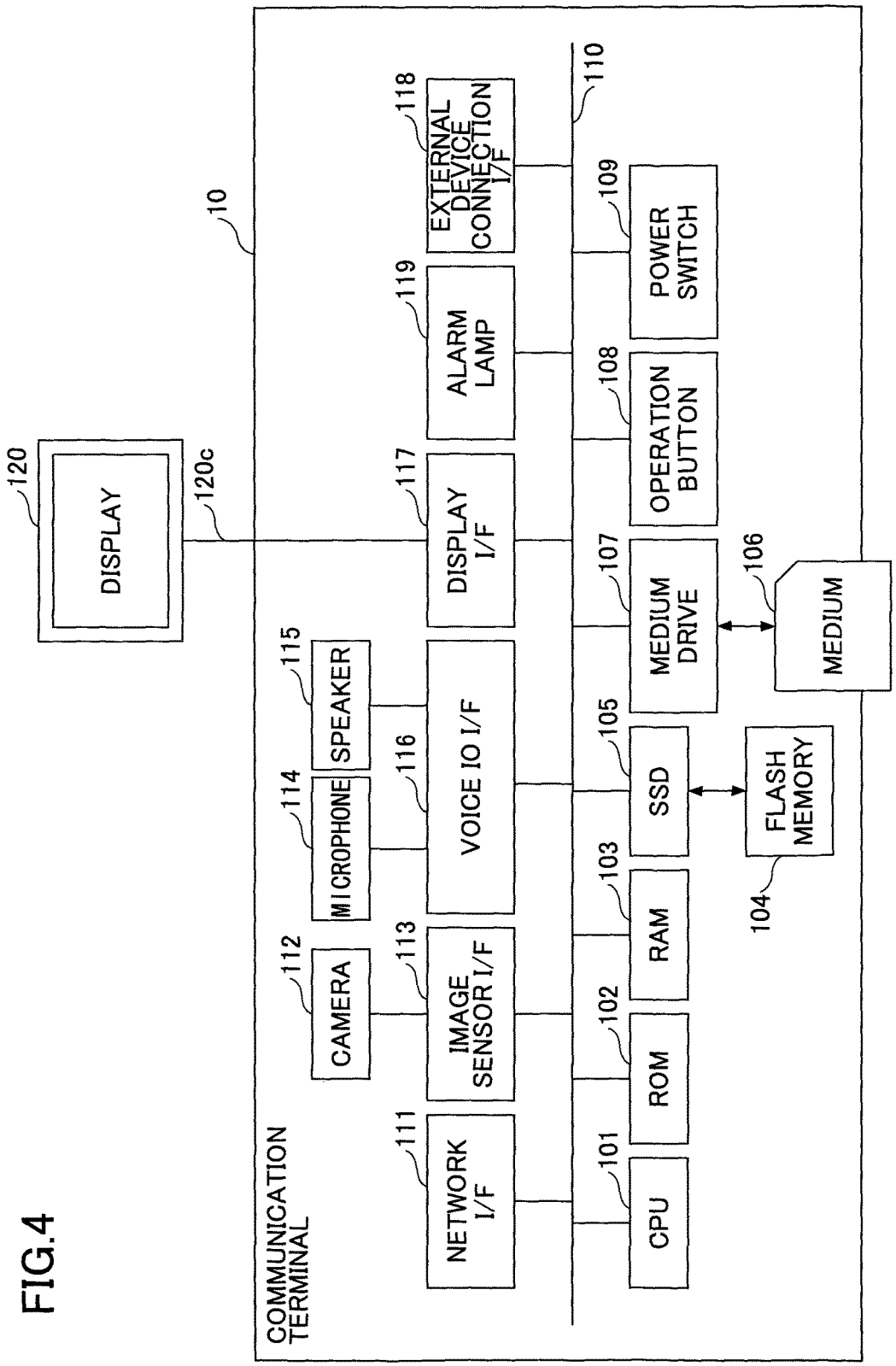
FIG. 4 is a block diagram showing the hardware configuration of the terminal according to the embodiment.

FIG. 4 is a block diagram showing the hardware configuration of the terminal 10 according to the embodiment. As shown in FIG. 4, the terminal 10 includes a central processing unit (CPU) 101 configured to control overall operations of the terminal 10; a read-only memory (ROM) 102 storing programs for the terminal, a random access memory (RAM) 103 used as a work area of the CPU 101, a flash memory 104 configured to store various data, such as image data and voice data, a solid state drive (SSD) 105 configured to control retrieval and writing (storing) of the various data in the flash memory 104 and the like based on the control of the CPU 101, a medium drive 107 configured to control retrieval and writing (storing) of data into a storage medium 106 such as a flash memory, the operation button 108 operated by a user for selecting an address of the terminal 10, the power switch 109 for switching ON/OFF of the power of the terminal 10, and a network interface (IF) 111 for transmitting data utilizing the communication network 2. Alternatively, the SSD 105 may be replaced with a Hard Disk Drive (HDD).

The terminal 10 further includes a built-in camera 112 configured to image a subject based on the control of the CPU 101, an image sensor interface (IF) 113 configured to control driving of the camera 112, the built-in microphone 114 configured to pick up audio sound, the built-in speaker 115, a voice input/output interface (I/O IF) 116, a display interface (IF) 117 configured to transmit image data to the external display 120 based on the control of the CPU 101, the external device connection interface (IF) 118 configured to connect various external devices, the alarm lamp 119 configured to inform the user of various functional problems of the terminal 10, and a bus line 110 such as an address bus or a data bus for electrically connecting the elements and devices with one another.

The display 120 is a display unit formed of liquid crystal or an organic EL material configured to display images of the subject or icons for operating the terminal 10. Further, the display 120 is connected to the display IF 117 via the cable 120c. The cable 120c may be an analog RGB (VGA) cable, a component video cable, a high-definition multimedia interface (HDMI) cable or a digital video interface (DVI) cable.

The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD).

The external device connection IF 118 may be connected via a universal serial bus (USB) cable with external devices, such as the external camera, the external microphone, and the external speaker. The USB cable is inserted in the connection port 1132 of the housing 1100 shown in FIG. 3.

When the external camera is connected to the external device connection IF 118 via the USB cable, the external camera is driven in priority to the built-in camera 112 according to control of the CPU 101. Similarly, when the external microphone or the external speaker is connected, the external microphone or the external speaker is driven in priority to the built-in microphone 114 or the built-in speaker 115 according to control of the CPU 101.

Note that the storage medium 106 is removable from the terminal 10. In addition, if the storage medium 106 is a non-volatile memory configured to retrieve or write data based on the control of the CPU 101, the storage medium 106 is not limited to the flash memory 104, and may be an electrically erasable and programmable ROM (EEPROM).

The above-described programs for the terminal may be recorded in an installable format or in an executable format on a computer-readable recording medium such as the storage medium 106 to distribute the medium. The above-described programs for the terminal may be recorded in the ROM 102 rather than the flash memory 104.

Figure 5:
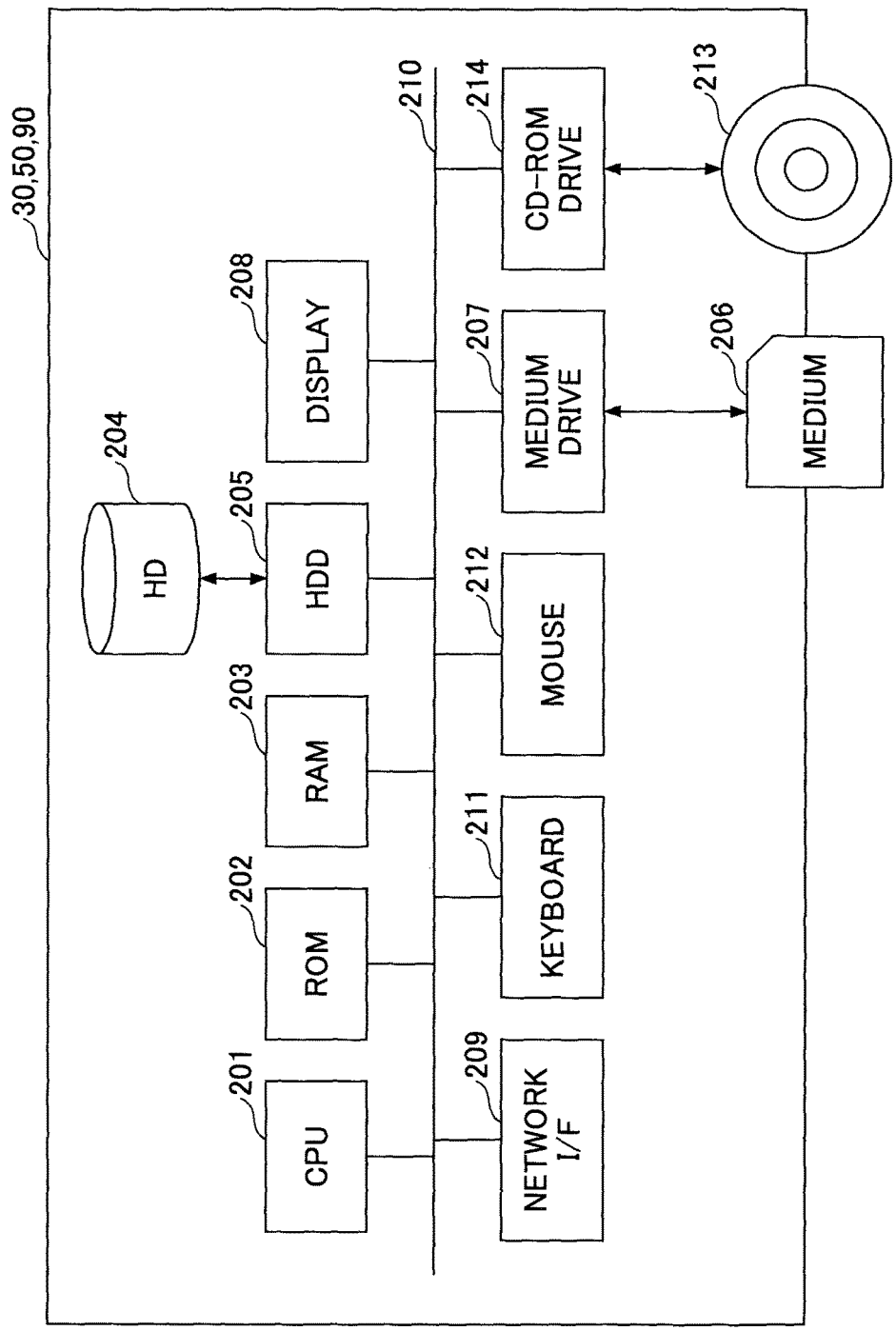
FIG. 5 is a block diagram showing the hardware configuration of a management system according to the embodiment.

FIG. 5 is a diagram showing the hardware configuration of the management system 50 according to the embodiment. The management system 50 includes a central processing unit (CPU) 201 configured to control overall operations of the management system 50, a read-only memory (ROM) 202 storing programs for the transmission management, a random access memory (RAM) 203 utilized as a work area of the CPU 201, a hard disk (HD) 204 configured to store various data, a hard disk drive (HDD) 205 configured to control retrieval and writing (storing) of the various data in the HD 204 based on the control of the CPU 201, a medium drive 207 configured to control retrieval and writing (storing) of data into a storage medium 206 such as a flash memory, a display 208 configured to display various information such as a cursor, menus, windows, characters and images, a network interface (IF) 209 for transmitting data utilizing the later-described communication network 2, a keyboard 211 including plural keys for inputting the characters, numerals, and various instructions, a mouse 212 for selecting or executing various instructions, selecting items to be processed, and moving the cursor, a CD-ROM drive 214 configured to control retrieval or writing of data in a compact disk read-only memory (CD-ROM) 213 as an example of a removable recording medium, and a bus line 210 such as an address bus or a data bus for electrically connecting the elements and devices with one another shown in FIG. 5.

Note that the above-described programs for the management system may be in an installable format or in an executable format on a computer-readable recording medium such as the storage medium 206 or the CD-ROM 213 to distribute the medium.

Further, the relay device 30 has a hardware configuration similar to that of the management system 50, and a description of the hardware configuration of the relay device 30 will be omitted. Note that the ROM 202 may store programs for controlling the relay device 30. In this case, the programs for the relay device may also be recorded in an installable format or in an executable format on a computer-readable recording medium such as the storage medium 206 or the CD-ROM 213 to distribute the medium.

Furthermore, the program provision system 90 has a hardware configuration similar to that of the management system 50, and a description of the hardware configuration of the program provision system 90 will be omitted. Note that the ROM 202 may store programs for controlling the program provision system 90. Also In this case, the programs for the program provision system 90 may also be recorded in an installable format or in an executable format on a computer-readable recording medium such as the storage medium 206 or the CD-ROM 213 to distribute the medium.

Note that other examples of the removable recording medium include a compact disc recordable (CD-R), a digital versatile disk (DVD), and a Blu-ray Disc (BD).

[Functional Configuration of Embodiment]

Figure 6:
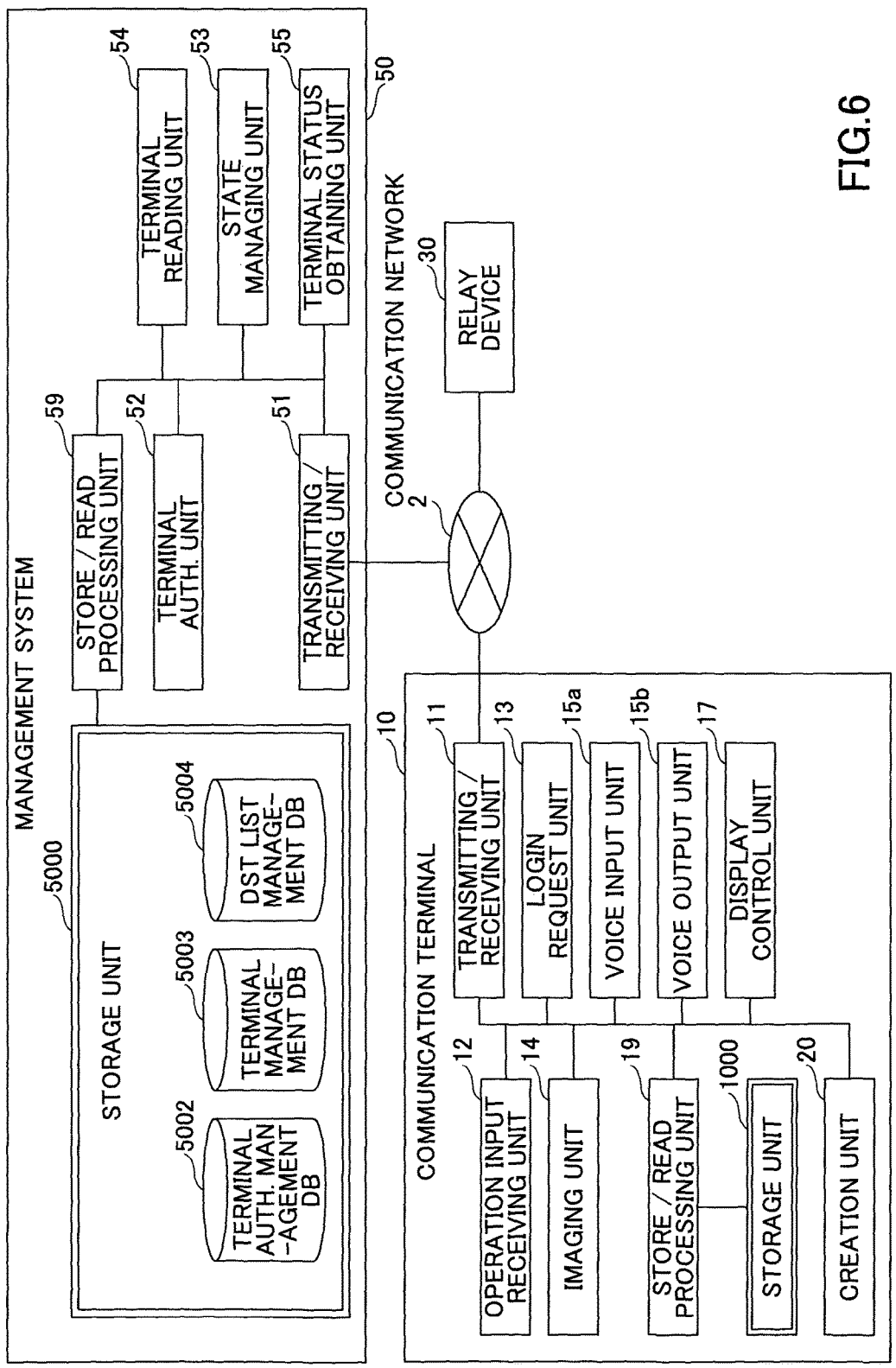
FIG. 6 is a block diagram showing the functional configuration of the terminal, and the management system according to the embodiment.

FIG. 6 is a block diagram showing the functional configuration of the transmission terminal 10 and the management system 50. As shown in FIG. 6, the transmission terminal 10, the relay device 30, and the management system 50 are connected via the communication network 2 so that these devices can communicate with one another. Note that the program provision system 90 as shown in FIG. 1 is not directly associated with videoconferencing communications, and therefore the illustrations thereof are omitted from FIG. 6.

[Functional Units of Terminal]

The terminal 10 includes a transmitting/receiving unit 11, an operation input receiving unit 12, a login request unit 13, an imaging unit 14, a voice input unit 15a, a voice output unit 15b, a display control unit 17, a store/read processing unit 19, and a creation unit 20.

Each unit may be implemented by the CPU 101 executing a transmission terminal control program deployed on the RAM 103 from the flash memory 104. In addition, the transmission terminal 10 has a storage unit 1000 including the RAM 103 and the flash memory 104.

The transmitting/receiving unit 11 is configured to transmit various data (information) to and receive such data from the other transmission terminals 10, relay devices 30, and the management system 50 via the communication network 2. The function of the transmitting/receiving unit 11 may be implemented by the network interface (IF) 111 and by instructions received from the CPU 101. A transmitting unit and a receiving unit of the transmission terminal 10 in an embodiment may be implemented by the transmitting/receiving unit 11.

For example, the receiving unit may receive a destination list representing candidates which may be destination terminals and statuses of the terminals.

The transmitting/receiving unit 11 may receive from the management system 50, prior to starting the video conference with a destination terminal, status data indicating statuses of the transmission terminals 10 as the candidates to be connected for the video conference.

The status data may indicate a status of whether the transmission terminal 10 is online or not as well as whether the transmission terminal 10 is online and ready to start a conference or online but during (already in) the conference (i.e. busy).

In addition, status data may indicate not only the above transmission status but a status of whether the cable 120c of the transmission terminal 10 is disconnected, a status indicating that the transmission terminal 10 is in a sound only mode, or a status indicating that the transmission terminal 10 is in a mute mode.

The operation input receiving unit 12 is configured to receive various inputs from the user, and such a function of the operation input receiving unit 12 is implemented by the operation button 108 and the power switch 109 and the instructions from the CPU 101. For example, when the user switches ON the power switch 109, the operation input receiving unit 12 receives a power-ON signal to turn ON the power supply of the terminal 10.

The operation input receiving unit 12 may accept a movement of a cursor shown on a destination selection screen by detecting pressing of the operation button 108.

The login request unit 13 is configured to transmit a login request message indicating that the user desires to login, and a current IP address of the terminal 10 as an IP address of a request source terminal from the transmitting/receiving unit 11 to the management system 50 via the communication network 2 when the power-ON signal is received by the operation input receiving unit 12 as a trigger. Such a function of the login request unit 13 is implemented by instructions received from the CPU 101.

When the user switches OFF the power switch 109, the transmitting/receiving unit 11 transmits power-OFF state information to the management system 50, and subsequently the operation input receiving unit turns OFF the power supply completely. Accordingly, the management system 50 may detect that the power of the terminal 10 is changed from the power-ON state to the power-OFF state.

The imaging unit 14 is configured to take an image of a subject and output image data of the subject for the transmitting/receiving unit 11. Such a function of the imaging unit 14 is implemented by instructions received from the CPU 101 and by the camera 112 and the image sensor IF 113.

The voice input unit 15a is configured to input voice data of the voice signal obtained by the microphone 114 that converts voice of the user into the voice signal, and such a function of the voice input unit 15a is implemented by instructions received from the CPU 101 and by the voice input/output IF 116.

The voice output unit 15b is configured to output a voice signal corresponding to the voice data to the speaker 115 and cause the speaker 115 to produce sound or voice according to the voice signal, and such a function of the voice output unit 15b is implemented by instructions received from the CPU 101 and by the voice input/output IF 116.

The display control unit 17 is configured to display various kinds of data on the display 120. The display control unit 17 displays an image indicated by the image data by transmitting the image data received by the transmitting/receiving unit 11 to the display 120. Such a function of the display control unit 17 is implemented by instructions received from the CPU 101 and by the display IF 117.

In addition, the display control unit 17 transmits to the display 120 the destination list which is received by the transmitting/receiving unit 11 from the management system 50 as the destination selection screen. In this way, the display control unit 17 may display the destination selection screen including the destination list on the display 120.

Furthermore, the display control unit 17 may execute a logic set for the first display control method employing the "Position Fixed" method and a logic set for the second display control method employing the "Keep Selected" method. The display control unit 17 displays the destination selection screen as switching logic sets. In the first display control method, the cursor's position is fixed on the destination list. In the second display control method, the cursor's position moves according to the destination terminal selected by the cursor.

For example, when a status of a destination terminal in the displayed destination list is changed, the display control unit 17 may select the first display control method or the second display control method depending on whether the cursor, which points at the destination terminal, is moved or not. That operation improves usability on the destination selection screen.

In addition, when the cursor is moved, the display control unit 17 may switch the display control methods depending on a status of a destination terminal which is newly pointed at by the cursor. In this way, only when the status of the destination terminal which is newly pointed at is offline, the second display control method may be used. For example, the user may wait until the status of the destination terminal becomes online while pointing at the destination terminal.

When the display control method is switched, the display control unit 17 may refer to a data storage unit storing first data indicating that the first display control method is used or second data identifying the destination terminal after the movement in the second display control method. The data storage unit may be included in the storage unit 1000 or the display control unit 17. That results in an easy switching method based on a display control flag stored in the data storage unit.

The data storage unit 17 may select the first display control method or the second display control method when the destination list is re-displayed after the screen showing the destination list transitions to another screen. In this way, the data storage unit 17 may choose the display control method when the destination selection screen is displayed after the other screen was displayed.

FIGS. 7A, 7B are drawings illustrating an example of a display control flag stored on the data storage unit. FIG. 7A shows that the first data "DC1" is stored as the display control flag. As shown in FIG. 7A, the first data "DC1" indicates that the first display control method is used.

FIG. 7B shows that the second data "01ab" is stored as the display control flag. As shown in FIG. 7B, the second data "01ab" indicates that the terminal 10 whose ID is "01ab" is selected and the second display control mode is used.

In the second display control method, when the cursor is moved, the data storage unit 17 may control the destination terminals to be shown so that the degree of the scroll of the screen is minimized. In this way, the process load may be minimized.

With reference to FIG. 6 again, the store/read processing unit 19 is configured to store various data in the storage unit 1000 or read various data from the storage unit 1000, and such a function of the store/read processing unit 19 is implemented by the SSD 105 and by instructions received from the CPU 101.

The creation unit 20 is configured to create and update, based on the destination list received from the management system 50 and the status data representing the terminal as the destination candidates (explained later), the destination list in which the statuses of the destination candidates are indicated with icons.

In addition, the creation unit 20 may create the destination list while sorting the destination terminals included in the destination list using their statuses. For example, the creation unit 20 may sort the destination terminals in the following order: the destination terminals which are online, the destination terminals which are online but during conference, and the destination terminals which are offline.

The storage unit 1000 stores a terminal identification (hereinafter called terminal ID), a password, etc., for identifying the terminal 10. The terminal ID may be information required to at least identify the transmission terminal 10. The terminal ID need not be stored in the transmission terminal 10 in advance. For example, the terminal ID may be identification to be input by user using the transmission terminal 10. Also, the storage unit 1000 may be used as a receiving buffer for the image data and voice data received from the destination terminal in the video conference.

[Functional Configuration of Management System]

The management system 50 includes a transmitting/receiving unit 51, a terminal authentication unit 52, a state managing unit 53, a terminal reading unit 54, a terminal status obtaining unit 55, and a store/read processing unit 59. These units of the management system 50 are implemented by the CPU 201 executing the programs for the management system read into the RAM 203 from the HD 204. Also, the management system 50 includes a storage unit 5000 which is formed of the HD 204.

[Terminal Authentication Management Table]

FIG. 8 is a drawing illustrating an example of a terminal authentication management table. The storage unit 5000 includes a terminal authentication management database 5002 which is formed of a terminal authentication management table as shown in FIG. 8. In this terminal authentication management table, passwords are respectively associated with the terminal IDs of all the transmission terminals 10 managed by the management system 50. For example, in the terminal authentication management table shown in FIG. 8, the terminal ID "01aa" of the transmission terminal 10*aa* is associated with the password "aaaa".

[Destination List Management Table]

FIG. 9 is a drawing illustrating an example of a destination list management table. The storage unit 5000 includes a destination list management database 5004 which is formed of a destination list management table as shown in FIG. 9.

In this destination list management table, terminal IDs of the terminals 10 as request source terminals are associated with terminal IDs of the destination terminals. The request source terminals are terminals which have requested to start the video conference. The destination terminals are terminals with which the request source terminals may communicate and which have been registered as candidates to be connected.

For example, in the destination list management table shown in FIG. 9, it is observed that the destination terminals with which the transmission terminal 10*aa* having the terminal ID "01aa" may start a video conference are the transmission terminal 10*ab* having the terminal ID "01ab"; the transmission terminal 10*ba* having the terminal ID "01ba"; the transmission terminal 10*db* having the terminal ID "01db"; the transmission terminal 10*dc* having the terminal ID "01dc"; the transmission terminal 10*ca* having the terminal ID "01ca"; and the transmission terminal 10*cb* having the terminal ID "01cb". The candidates of the destination terminals are added or removed in response to a request from the transmission terminal 10 to the management system 50.

[Terminal Management Table]

FIG. 10 is a drawing illustrating an example of a terminal management table. The storage unit 5000 includes a terminal management database 5003 which is formed of a terminal management table as shown in FIG. 10.

In this terminal management table, the terminal IDs of the transmission terminals 10 are associated with names of the transmission terminals 10 (hereinafter called "terminal name"), statuses (transmission statuses) of the transmission terminals 10, receiving dates, and the IP addresses of the transmission terminals 10. The receiving dates indicate dates when the management system 50 receives a login request message in order to login to the transmission system 1. The terminal name may be a name associated with the terminal such as a user name or an office name.

For example, in the terminal management table shown in FIG. 10, the terminal ID "01aa" of the transmission terminal 10*aa* is associated with the terminal name "Japan Tokyo Office AA Terminal", the transmission status "Online (During Mtg)", the receiving date "Nov. 10, 2009 1:40 PM", and the IP address "1.2.1.3" of the transmission terminal 10*aa*.

Here, the terminal ID shown in the terminal management table is uniquely assigned on registration of the transmission system 1. The terminal name may be registered or modified by an administrator of the management system 50 or a user of the transmission terminal 10. In addition, the terminal name may be registered or modified in response to a request from the transmission terminal 10 to the management system 50.

The transmission status "Online (Available)" indicates that the transmission terminal 10 is logged in to the transmission system 1 and has not joined any video conferences. The transmission status "Online (During Mtg)" indicates that the transmission terminal 10 is logged in to the transmission system 1 and has joined a video conference. The transmission status "Offline" indicates that the transmission terminal 10 is not logged in to the transmission system 1.

With reference to FIG. 6 again, the transmitting/receiving unit 51 may be implemented by the CPU 201 and the network I/F 209. The transmitting/receiving unit 51 is configured to transmit and receive various types of data or information to and from other transmission terminals 10 or devices 30, 90 via the communication network 2.

The transmitting/receiving unit 51 is configured to transmit the destination list and the status of the terminal as the destination candidate to the request source terminal. In addition, the transmitting/receiving unit 51 transmits, when the status of the terminal as the destination candidate is updated, an updated status to the request source terminal.

The terminal authentication unit 52 may be implemented by instructions executed by the CPU 201. The terminal authentication unit 52 is configured to search for the terminal authentication management DB 5002 of the storage unit 5000 with the terminal ID and the password contained in the login request message received by the transmitting/receiving unit 51 used as search keys. The terminal authentication unit 52 authenticates the terminal based on whether the terminal ID and the password contained in the login request message are identical to those stored in the terminal authentication management DB 5002.

The state managing unit 53 may be implemented by instructions executed by the CPU 201. The state managing unit 53 is configured to manage the status of the request source terminal which has sent the login request. The state managing unit 53 is configured to manage the terminal management DB 5003 (FIG. 10) by associating the terminal ID with the status, the receiving date of the login request on the management system 50 and the IP address of the request source terminal and storing them.

For example, when a user turns off the power switch 109 of the transmission terminal 10 which has turned on, the state managing unit 53 modifies the transmission status of the transmission terminal 10 managed in the terminal management DB 5003 (FIG. 10) from online to offline based on a status message indicating that the power is turned off from the transmission terminal 10.

The terminal reading unit 54 may be implemented by instructions executed by the CPU 201. The terminal reading unit 54 is configured to search the destination list management DB 5004 (FIG. 9) with the terminal ID of the request source terminal which sent the login request message used as a search key and read the terminal IDs of the candidates for the destination terminals for the request source terminal.

In addition, the terminal reading unit 54 is configured to search the destination list management DB 5004 (FIG. 9) with the terminal ID of the request source terminal which sent the login request message used as a search key and read the terminal IDs of the other transmission terminals which have registered the terminal ID of the request source terminal as a candidate of the destination terminal.

The terminal status obtaining unit 55 may be implemented by instructions executed by the CPU 201. The terminal status obtaining unit 55 is configured to search the terminal management DB 5003 (FIG. 10) with the terminal IDs of the candidates of the destination terminals read by the terminal reading unit 54 used as search keys and read the statuses for the found terminal IDs.

Accordingly, the terminal status obtaining unit 55 may obtain the statuses of the candidates of the destination terminals for the request source terminal which sent the login request message. In addition, the terminal status obtaining unit 55 is configured to obtain the status of the request source terminal which sent the login request message by searching the terminal management DB 5003 with the terminal ID read by the terminal reading unit 54 used as a search key.

The store/read processing unit 59 is configured to perform a process which stores various data in the storage unit 5000 and reads the stored data from the storage unit 5000.

[Destination Selection Screen Displayed on the Terminal]

Next, an example of the control for the destination selection screen displayed on the display 120 of the transmission terminal 10 is explained. FIGS. 11-16 show examples of the display control for the destination selection screen displayed on the display 120.

FIG. 11 shows an example of display control according to the first display control method. FIG. 11 shows an example of the destination selection screen including the destination list. The destination selection screen shown in FIG. 11 shows the terminal IDs 1100-2 of the destination terminals, the terminal names 1100-3, icons 1100-4*a*-1100-4*c* which may be changed depending on the status, and a cursor 1100-5 pointing at a destination terminal, which are set in a destination list frame 1100-1.

The icons may include an offline icon 1100-4*a* which indicates that the terminal is offline; an online (available) icon 1100-4*b* which indicates that the terminal is online and ready to start a video conference; and an online (during meeting) icon 1100-4*c* which indicates that the terminal is online but during the video conference.

The creation unit 20 may assign the online (available) icon 1100-4*b* to a destination terminal whose status is "Online (Available)". The creation unit 20 may assign the online (during meeting) icon 1100-4*c* to a destination terminal whose status is "Online (During Mtg)". The creation unit 20 may assign the offline icon 1100-4*a* to a destination terminal whose status is "Offline". Alternatively, the creation unit 20 may assign any characters or signs to each destination terminal instead of such icons.

In the example shown in FIG. 11, the display control unit 17 may perform the first display control method. Before the statuses of the destination terminals shown in FIG. 11, the cursor 1100-5 points at the destination terminal having the terminal ID "01ba". Now, the status of the destination terminal having the terminal ID "01ba" becomes "Offline" from "Online (Available)".

Subsequently, the alignment of the destination terminals is sorted, but the position of the cursor 1100-5 is not changed. Thus, the cursor 1100-5 points at the destination terminal having the terminal ID "01db".

FIG. 12 shows an example of display control according to the second display control method. In the example shown in FIG. 12, the display control unit 17 may perform the second display control method. Before the statuses of the destination terminals shown in FIG. 12, the cursor 1100-5 points at the destination terminal having the terminal ID "01ba". Now, the status of the destination terminal having the terminal ID "01ba" becomes "Offline" from "Online (Available)".

Subsequently, the alignment of the destination terminals is sorted, and the cursor 1100-5 pursues the destination terminal having the terminal ID "01ba". Thus, the cursor 1100-5 still points at the destination terminal having the terminal ID "01ba".

FIG. 13 shows an example of a cursor's movement. In the example shown in FIG. 13, the user moves the cursor from a default position of the cursor when the destination selection screen is displayed.

As shown in FIG. 13, the default position of the cursor is the top of the list showing the destination terminals in the destination selection screen. In the example of FIG. 13, the default cursor points at the destination terminal having the terminal ID "01ba".

Next, the user moves the cursor position to the position indicating the destination terminal having the terminal ID "01ab" using the operation buttons 108 or a mouse. Here, the display control unit 17 detects the movement of the cursor and changes the display control method from the first display control method to the second display control method.

FIG. 14 is a drawing illustrating a screen transition according to a first example. In the example shown in FIG. 14, a cursor 1100-5 is pointing at the position where an offline destination terminal having the terminal ID "01cb" is displayed.

Here, the status of the destination terminal having the terminal ID "01cb" becomes "Online (Available)". Since the cursor is moved, the display control unit 17 selects the second display control method and causes the cursor 1100-5 to pursue the destination terminal having the terminal ID "01cb". In addition, since the status of the destination terminal having the terminal ID "01cb" is changed, the destination terminal is displayed after the list is sorted.

As shown in FIG. 14, the display control unit 17 determines the candidate of the destination terminal displayed on the display screen so that the moving distance of the cursor 1100-5 is minimized. For example, as shown in FIG. 14, when the display control unit 17 causes the cursor 1100-5 to pursue the destination terminal whose status becomes online from offline, the display control unit 17 sets the position of the cursor 1100-5 on the top of the list. Accordingly, the moving distance of the cursor 1100-5 (i.e. an amount of scroll on the display screen) may be minimized.

FIG. 15 is a drawing illustrating a screen transition according to a second example. In the example shown in FIG. 15, a cursor 1100-5 is pointing at the position where an online (available) destination terminal having the terminal ID "01db" is displayed. First, the statuses of the terminals other than the terminal having terminal ID "01ba" or "01db" are "Online (During Mtg)".

Here, the transmission status of the destination terminal having the terminal ID "01db" becomes "Offline". Since the cursor is moved, the display control unit 17 selects the second' display control method and causes the cursor 1100-5 to pursue the destination terminal having the terminal ID "01db". In addition, since the status of the destination terminal having the terminal ID "01db" is changed, the destination terminal is displayed after the list is sorted.

As shown in FIG. 15, the display control unit 17 determines the candidate of the destination terminal displayed on the display screen so that the moving distance (i.e. an amount of scroll on the display screen) of the cursor 1100-5 is minimized. For example, as shown in FIG. 15, when the display control unit 17 causes the cursor 1100-5 to pursue the destination terminal whose status becomes offline from online, the display control unit 17 sets the position of the cursor 1100-5 on the bottom of the list. Accordingly, the moving distance of the cursor 1100-5 (i.e. an amount of scroll on the display screen) may be minimized.

FIGS. 14 and 15 show cases where a page on which the pointed-to destination terminal is displayed is changed according to the change of the status of the destination terminal at which the cursor 1100-5 is pointing without the above-explained display control. In the following, an example in which the page is not changed is explained.

FIG. 16 is a drawing illustrating a screen transition according to a third example. In the example shown in FIG. 16, a cursor 1100-5 is pointing at the position where an online (available) destination terminal having the terminal ID "01ba" is displayed. Here, the cursor 1100-5 has returned to the current position indicating the terminal having the terminal ID "01ba" once the cursor 1100-5 is moved to the other position.

Here, the status of the destination terminal having the terminal ID "01ba" becomes "Online (During Mtg)". Since the cursor is moved, the display control unit 17 selects the second display control method, and causes the cursor 1100-5 to pursue the destination terminal having the terminal ID "01ba". In addition, since the status of the destination terminal having the terminal ID "01ba" is changed, the destination terminal is displayed after the list is sorted.

As shown in FIG. 16, the display control unit 17 determines the candidate of the destination terminal displayed on the display screen so that the moving distance of the cursor 1100-5 is minimized. However, in the example shown in FIG. 16, the page in which the pointed destination terminal is displayed is not changed even if the displayed destination terminals are sorted. Here, when the page of the display screen is not changed according to the sorting of the destination terminals, the display control unit 17 may cause the cursor 1100-5 to pursue the pointed-at destination terminal within the page.

As a result, the display control for the destination selection screen improves usability of the destination selection screen.

[Operation]

Figure 17:
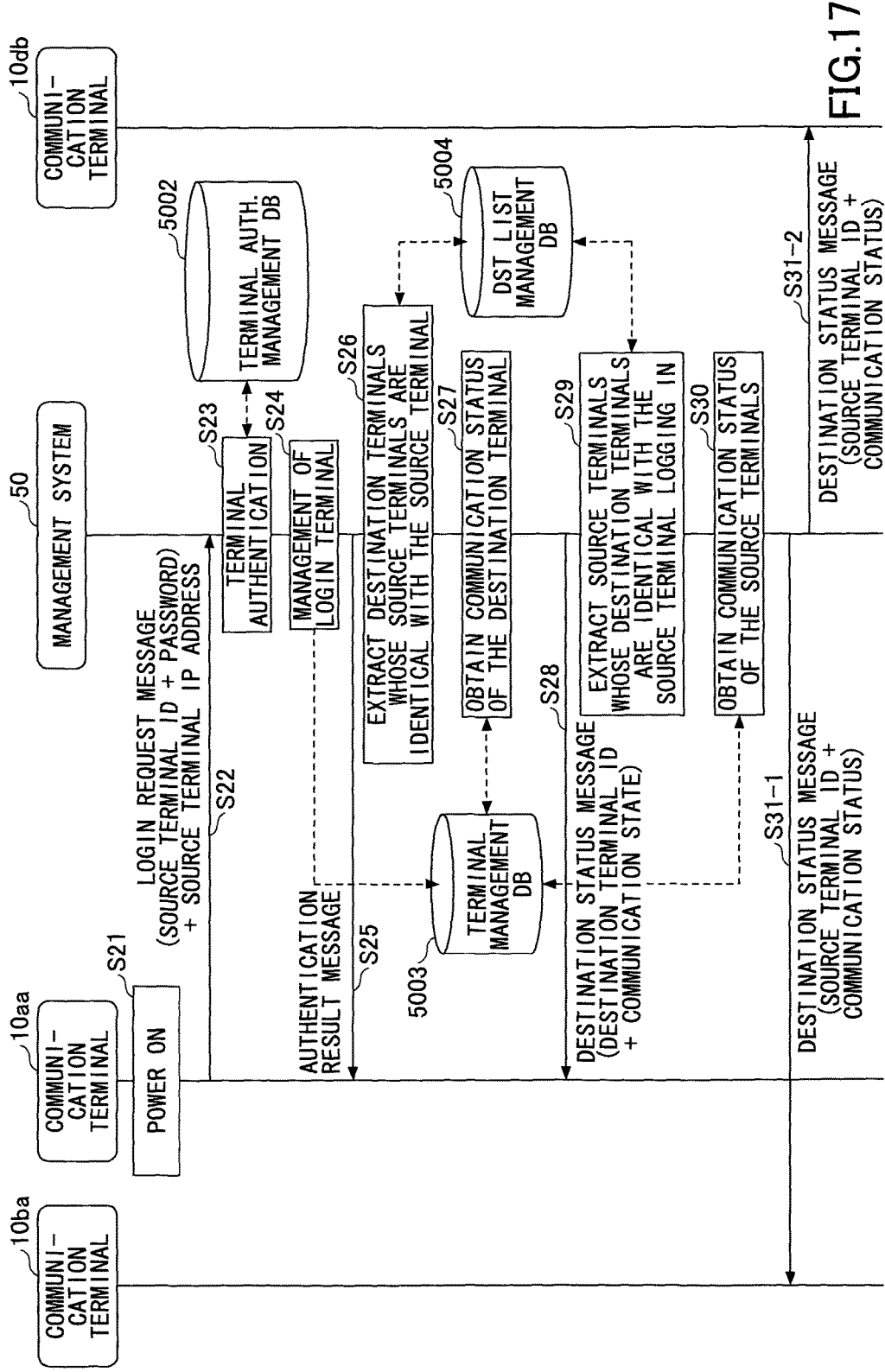
FIG. 17 is a sequence chart illustrating a preparation process for a transmission terminal to become a ready state to join a video conference.

Next, the processes carried out by the transmission system 1 according to the embodiment will be described. FIG. 17 is a sequence chart illustrating a preparation process for a transmission terminal to become a ready state to join a video conference. FIG. 17 shows an example in which the transmission terminal 10aa becomes ready. In the preparation process, various kinds of data are transmitted/received with the management data sessions sei (See FIG. 2).

At Step S21, if the user of the terminal 10aa switches ON the power switch 109, the operation input receiving unit 12 receives a power-ON signal from the power switch 109 and turns ON the power supply of the terminal 10aa.

At Step S22, in response to the power-ON signal, the login request unit 13 transmits a login request message indicating the user's login request from the transmitting/receiving unit 11 to the management system 50 via the communication network 2. Here, the login request is transmitted in response to the power-ON signal. However, the login request may be transmitted in response to starting of a program or any user operation.

This login request message contains the terminal ID and the password which identify the terminal 10aa as the request source terminal. The terminal ID and the password are read from the storage unit 1000 through the store/read processing unit 19.

Note that when the transmission terminal 10aa transmits the login request message to the management system 50, the management system 50 may detect the IP address of the terminal 10aa as the transmitter station.

At Step S23, the terminal authentication unit 52 of the management system 50 authenticates the transmission terminal 10aa by using the terminal ID and the password contained in the login request message received at the transmitting/receiving unit 51. The terminal authentication unit 52 authenticates the terminal by searching the terminal authentication management DB (See FIG. 8) of the storage unit 5000 by using the terminal ID and the password as search keys and determining whether the terminal ID and password contained in the login request message are identical to those managed in the terminal authentication management DB 5002.

When the terminal authentication unit 52 determines that the terminal ID and password contained in the login request message are identical to those managed in the terminal authentication management DB 5002 (i.e. the login request is sent from the transmission terminal 10 which does not have valid right), the transmitting/receiving unit 51 transmits, via the communication network 2, an authentication result message indicating authentication result obtained by the terminal authentication unit 52 to the transmission terminal 10aa which has sent the login request message. Subsequently, the preparation process ends.

When the terminal authentication unit 52 determines that the terminal ID and password contained in the login request message are not identical to those managed in the terminal authentication management DB 5002 (i.e. the login request is sent from the transmission terminal 10 which has valid right), the state managing unit 53 associates the terminal ID of the transmission terminal 10aa with the IP address of the transmission terminal 10aa, the transmission status, and the receiving date and stores them in the terminal management DB 5003.

The terminal management table manages a set of the terminal ID "01aa", the IP address "1.2.1.3" of the transmission terminal 10aa, the transmission status "Online (During Mtg)", and the receiving date "Nov. 10, 2009 1:40 PM". Alternatively, the terminal management table stores the terminal ID and the IP address which are associated in advance, and the transmission status, the receiving date, and the participant may be associated each time.

At Step S25, the transmitting/receiving unit 51 of the management system 50 transmits the authentication result message, indicating the authentication result obtained from the terminal authentication unit 52, through the communication network 2 to the transmission terminal 10aa from which the above login request message has been received.

At Step S26, the terminal reading unit 54 of the management system 50 searches the destination list management table (FIG. 9) by using the terminal ID "01aa" of the terminal 10aa from which the login request message has been received as a search key, and reads the terminal IDs of the candidates of the destination terminals 10 for the transmission terminal 10aa.

Here, the terminal ID "01ab" of the transmission terminal 10ab, the terminal ID "01ba" of the transmission terminal 10ba, the terminal ID "01db" of the transmission terminal 10db, and the terminal ID "01dc" of the transmission terminal 10dc are read as the destination terminals for the transmission terminal 10aa having the terminal ID "01aa".

At Step S27, the terminal status obtaining unit 55 of the management system 50 uses the terminal IDs "01ab", "01ba", "01db", "01dc", "01ca", and "01cb" of the destination terminals which are read by the terminal reading unit 54 as search keys. The terminal status obtaining unit 55 searches the terminal management DB 5003 using the search keys and reads the transmission status "Offline", "Online (Available)", or "Online (During Mtg)" for each of the destination terminals read by the terminal reading unit 54. In this way, the transmission statuses of the transmission terminals 10ab, 10ba, 10db, 10dc, 10ca, and 10cb may be obtained. Here, the terminal status obtaining unit 55 monitors the terminal management DB 5003 and obtains the updated transmission status.

At Step S28, the transmitting/receiving unit of the management system 50 transmits, via the communication network 2 to the transmission terminal 10aa, a status message including the terminal IDs "01ab", "01ba", "01db", "01dc", "01ca", and "01cb" and the transmission statuses (i.e. "Offline", "Online (Available)", "Online (During Mtg)") of the transmission terminals 10ab, 10ba, 10db, 10dc, 10ca, 10cb.

In this way, the transmission terminal 10aa may know each status ("Offline", "Online (Available)", "Online (During Mtg)") of the transmission terminals 10ab, 10ba, 10db, 10dc, 10ca, and 10cb as the destination terminals.

At Step S29, the terminal reading unit 54 of the management system 50 uses the terminal ID "01aa" of the transmission terminal which has sent the login request message as a search key. The terminal reading unit 54 searches the destination list management DB 5005 using the search key and reads the terminal IDs of the other transmission terminals which have registered the transmission terminal 10aa having the terminal ID "01aa" as the candidate of the destination terminal. For example, the terminal IDs "01ab", "01ba", "01db", "01dc", "01ca", and "01cb" are read in the destination list management table shown in FIG. 9.

At Step S30, the state managing unit 53 of the management system 50 uses the terminal ID "01aa" of the transmission terminal 10aa which has sent the login request message as a search key. The state managing unit 53 searches the terminal management DB 5003 using the search key and obtains the status "Online (Available)" of the transmission terminal 10aa which has sent the login request message.

At Steps S31-1 and S31-2, the transmitting/receiving unit 51 of the management system 50 identifies the transmission terminals 10ba and 10db from the transmission terminal 10ab, 10ba, 10db, 10dc, 10ca, and 10cb (terminal IDs are read at Step S29), whose statuses are "Online (Available)" in the terminal management DB 5003. The transmitting/receiving unit 51 transmits a status message including the terminal ID "01aa" and the status "Online (During Mtg) of the transmission terminal 10aa obtained at Step S30 to the identified transmission terminals 10ba, 10db.

When the transmitting/receiving unit 51 transmits the status message to the transmission terminals 10ba and 10db, the transmitting/receiving unit 51 refers to, based on the terminal IDs "01ba", "01db", the IP address of the transmission terminals managed in the terminal management table.

In this way, the terminal ID "01aa" and the status "Online (During Mtg)" of the transmission terminal 10aa which has sent the login request may be conveyed to the transmission terminals 10db, 10ba which may communicate with the transmission terminal 10aa as the destination terminal.

In addition, when Step S28 has been performed in the preparation process, the display control unit 17 of the transmission terminal 10aa may highlight information about terminals (e.g. "Online (During Mtg)" or "Online (Available)") which are attending the video conference on the destination list shown on the display 120. In this way, the user may recognize which transmission terminal 10 is online (available) or online (during meeting).

Figure 18:
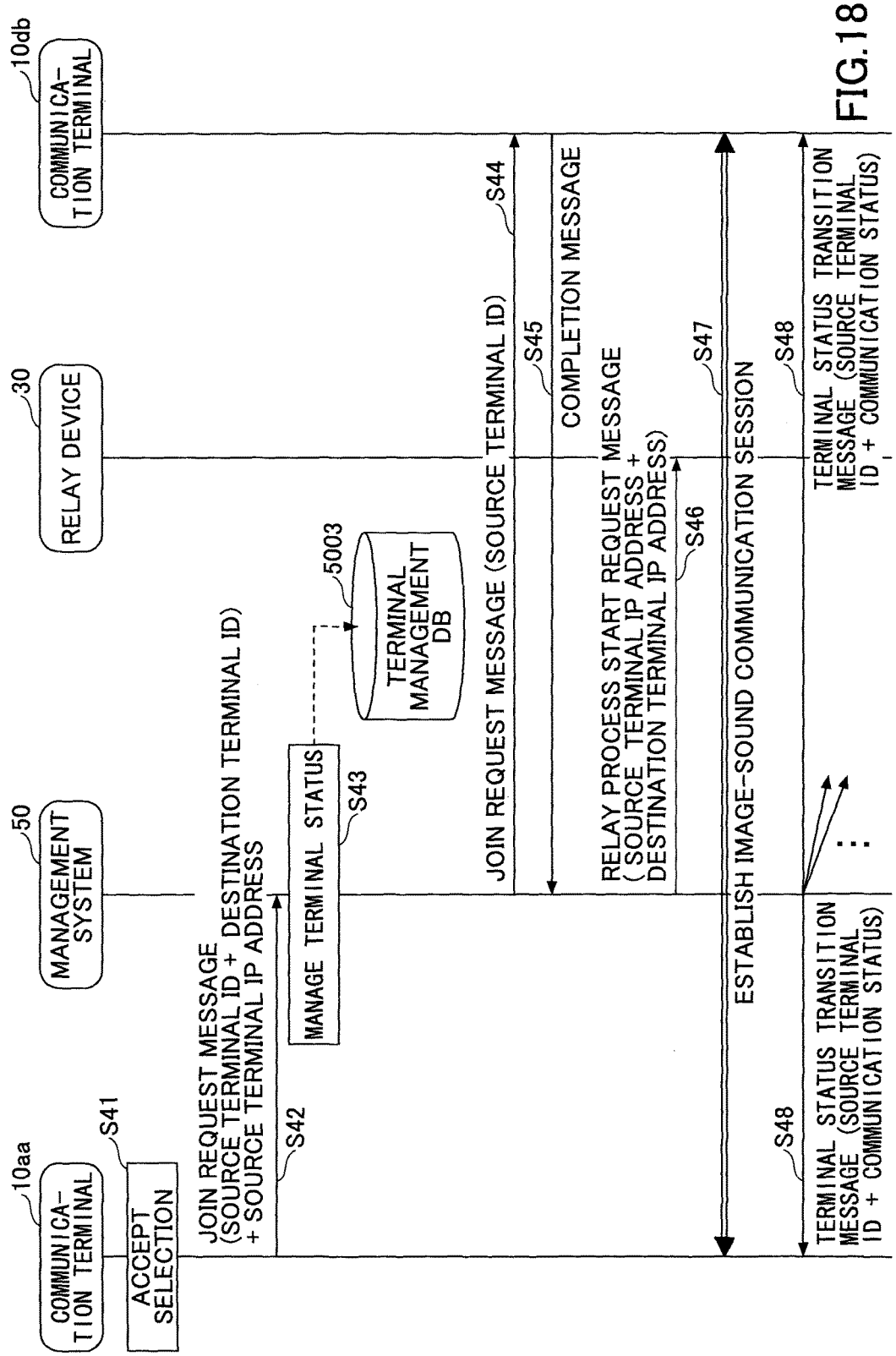
FIG. 18 is a sequence chart illustrating a join process for the transmission terminal to become a join state for the video conference.

FIG. 18 is a sequence chart illustrating a join process for the transmission terminal to become a join state for the video conference. In an example shown in FIG. 18, the transmission terminal 10aa becomes the join state. In the join process, various kinds of data may be conveyed via the management data session sei (See FIG. 2).

At Step S41, when the user presses the operation buttons 108 to join a video conference, the operation input receiving unit 12 accepts a request to start the video conference with the transmission terminal 10db.

At Step S42, in response to the request, the transmitting/receiving unit 11 of the transmission terminal 10aa transmits to the management system 50 a join request message including the terminal ID "01aa" of the transmission terminal 10aa and the terminal ID "01db" of the transmission terminal 10db; and indicating that the transmission terminal 10aa joins the video conference.

In this way, the transmitting/receiving unit of the management system 50 receives the join request message and recognizes the IP address "1.2.1.3" of the transmission terminal 10aa as the source terminal.

At Step S43, the state managing unit 53 of the management system 50 uses the terminal ID "01aa" of the transmission terminal 10aa, which is included in the join request message, as a search key. The state managing unit 53 searches the terminal management DB 5003 (See FIG. 10) with the search key and sets the transmission status of the transmission terminal 10aa which has requested to join the video conference to "Online (During Mtg)".

At Step S44, the transmitting/receiving unit 51 of the management system 50 transmits to the transmission terminal 10db a join request message including the terminal ID "01aa" of the transmission terminal 10aa via the communication network 2. In this way, the transmission terminal 10db may know which transmission terminal 10 has sent the request to join the video conference.

At Step S45, the transmission terminal 10db transmits from the transmitting/receiving unit 11 to the management system 50 via the communication network 2 a completion message indicating that the join request message has been received.

At Step S46, the transmitting/receiving unit 51 of the management system 50 transmits to the relay device 30 via the communication network 2 a relay process start request message indicating a request to start a relay process. The relay process start request message includes the IP address "1.2.1.3" of the transmission terminal 10aa and the IP address "1.3.2.4" of the transmission terminal 10db.

At Step S47, the relay device 30 establishes a session to convey image data and voice data between the transmission terminal 10aa and the transmission terminal 10db. In this way, the transmission terminal 10aa may join the video conference with the transmission terminal 10db.

As Step S48, the transmitting/receiving unit of the management system 50 transmits to each transmission terminal 10 which is registered in the terminal management DB 5003 a terminal status transition message including the terminal ID "01aa" of the transmission terminal 10aa and the status "Online (During Mtg)". In this way, each transmission terminal which receives the terminal status transition message may store and display the status of the transmission terminal 10aa having the terminal ID "01aa".

FIG. 19 is a flowchart illustrating an example of information processing for displaying the destination selection screen. At Step S101 shown in FIG. 19, the transmitting/receiving unit 11 receives a destination list message indicating the destination candidates to be destinations of content data; and a status message including the transmission status of each destination terminal.

At Step S102, the creation unit 20 creates a destination list based on the received destination list message and the status message. The creation unit 20 may sort the destination candidates on the destination list according to their statuses.

At Step S103, the display control unit 17 displays, using the first display control method, a destination selection screen including the created destination list.

At Step S104, the display control unit 17 determines whether a cursor displayed on the destination selection screen is moved. When the cursor is moved (Step S104—YES), the process goes to Step S105. Otherwise (Step S104—NO), the process goes to Step S106.

At Step S105, the display control unit 17 switches display control for the destination selection screen from the first display control method to the second display control method. The display control unit 17 remembers the terminal ID of the terminal which is pointed at by the moved cursor as a display control flag.

At Step S106, the creation unit 20 determines that the transmission statuses of the transmission terminals included in the destination list are changed. The creation unit 20 may determine that by confirming whether the terminal status transition message is obtained or not. When the transmission statuses are not changed (Step S106—YES), the process goes to Step S108. Otherwise (Step S106—NO), the process goes to Step S107.

At Step S107, the creation unit 20 updates the destination list. In the update, the icon is changed and the destination terminals are re-sorted. After Step S107, the process goes back to Step S104.

At Step S108, the display control unit 17 determines whether an instruction for screen transition is detected. The screen transition is to transition to an other screen. For example, the screen transition occurs when a "back" button is pressed to go back to the previous screen or when the online destination is selected to show a connection screen. When the screen transition is detected (Step S108—YES), the process goes to Step S109. Otherwise, the process goes back to Step S104.

At Step S109, the display control unit 17 causes the screen to transition to the other screen. When the destination selection screen is displayed again after the other screen is displayed, the display control unit 17 may display the destination selection screen using the second display control method as referring to the display control flag. In addition, the display control unit 17 may clear the display control flag to use the first display control method when the screen is transitioned. It may be pre-configured which display control method (i.e. the first display control method or the second display control method) is used when the screen transitions back to the destination selection screen from the other screen.

According to the embodiment, usability on the destination selection screen may be improved.

In the second display control method, when the cursor points at the destination terminal which is offline, the display control unit 17 may automatically connect the destination terminal when the destination terminal becomes online. In this way, an operation to select the destination terminal which becomes online may be omitted.

The programs executed in each device explained in the embodiment may be in an installable format or in an executable format on a computer-readable recording medium such as a CD-ROM, a flexible disk (FD), a CD-R, or a digital versatile disk (DVD).

The programs executed on each device according to the embodiment may be stored on a computer connected to a network such as the Internet and may be provided by downloading via the network. The programs executed on each device according to the embodiment may be provided or distributed with the network such as the Internet.

Alternatively, the programs executed on each device according to the embodiment may be stored in the ROM in advance and provided.

The programs executed on each device according to the embodiment include modules including the above-mentioned units. In practice, the CPU loads the programs from the ROM or HDD and executes them to load one or more units onto the RAM and create the units on the RAM.

The above-mentioned information processing terminal, the information processing method, and the recording medium are not limited to the above embodiments and various variations and modifications may be made without departing from the scope of the present invention. In addition, it is possible to form various inventions by combining any elements which are mentioned above.

The present application is based upon and claims the benefit of priority of Japanese Patent Application No. 2013-015919 filed on Jan. 30, 2013, the entire contents of which are incorporated herein by reference.

PATENT DOCUMENT

[Patent Document 1] Japanese Laid-open Patent Publication No. 2012-054646

The invention claimed is:
1. An information processing terminal comprising:
processing circuitry configured to
receive a destination list data specifying one or more destination terminals with which the information processing terminal is operable to initiate communications and to receive status data representing communication statuses of the destination terminals;
create a destination list to display identifiers of the destination terminals using the destination list data and the status data, wherein a sequence in which the identifiers are arranged in the destination list is updated when one of the communication statuses is updated; and
control display of the destination list including the identifiers and display of a cursor at a position in the sequence in which the identifiers are arranged to indicate a current selection of one of the identifiers;
wherein when at least one of the communication statuses is updated causing a change in the sequence in which the identifiers are arranged in the destination list, without a change in the overall position of the displayed destination list on a display screen, the processing circuitry automatically selects one of a first mode and a second mode depending on whether one of the identifiers at a sequence position on the destination list is indicated as currently selected by the cursor in response to a user operation to select the one of the identifiers, the first mode being selected when the user operation to select one of the identifiers by the cursor has not occurred, and the second mode being selected when the user operation to select one of the identifiers by the cursor has occurred, and wherein in the first mode, the processing circuitry maintains the cursor at the sequence position within the destination list when a change in a sequence position of the selected one of the identifiers occurs when the sequence is updated based on the update of at least one of the communication statuses, and in the second mode, the processing circuitry automatically moves the cursor from the sequence position to a new sequence position within the destination list at which the selected one of the identifiers is placed even when a change in a sequence position of the selected one of the identifiers occurs when the sequence is updated based on the update of at least one of the communication statuses.

2. The information processing terminal as claimed in claim 1, wherein the processing circuitry selects one of the modes depending on the status of the destination terminal having the position indicted as the current selection by the cursor.

3. The information processing terminal as claimed in claim 1, further comprising a memory configured to store first data representing that the first mode is selected or second data specifying the identifier selected by the cursor in the second mode, wherein the processing circuitry refers to the memory when the processing circuitry selects the mode.

4. The information processing terminal as claimed in claim 3, wherein the processing circuitry selects one of the modes when a screen showing the destination list is displayed after the screen transitions to another screen.

5. The information processing terminal as claimed in claim 1, wherein the processing circuitry creates the destination list by sorting the identifiers of the destination terminals using the statuses of the destination terminals, and in the second mode, the processing circuitry changes the position of the cursor within a page of the destination list currently displayed.

6. An information processing method executed by an information processing terminal, the information processing method comprising:

receiving a destination list data specifying one or more destination terminals with which the information processing terminal is operable to initiate communications and receive status data representing communication statuses of the destination terminals;

creating a destination list to display identifiers of the destination terminals using the destination list data and the status data, wherein a sequence in which the identifiers are arranged in the destination list is updated when one of the communication statuses is updated;

controlling display of the destination list including the identifiers and display of a cursor at a position in the sequence in which the identifiers are arranged to indicate a current selection of one of the identifiers; and when at least one of the communication statuses is updated causing a change in the sequence in which the identifiers are arranged in the destination list, without a change in the overall position of the displayed destination list on a display screen, automatically selecting one of a first mode and a second mode depending on whether one of the identifiers at a sequence position on the destination list is indicated as currently selected by the cursor in response to a user operation to select the one of the identifiers, the first mode being selected when the user operation to select one of the identifiers by the cursor has not occurred, and the second mode being selected when the user operation to select one of the identifiers by the cursor has occurred, wherein in the first mode, the method includes maintaining the cursor at the sequence position within the destination list when a change in a sequence position of the selected one of the identifiers occurs when the sequence is updated based on the update of at least one of the communication statuses, and in the second mode, the method includes automatically moving the cursor from the sequence position to a new sequence position within the destination list at which the selected one of the identifiers is placed even when a change in a sequence position of the selected one of the identifiers occurs when the sequence is updated based on the update of at least one of the communication statuses.

7. A non-transitory computer-readable recording medium storing a program for causing an information processing terminal to perform a method, the method comprising:

receiving a destination list data specifying one or more destination terminals with which the information processing terminal is operable to initiate communications and receive status data representing communication statuses of the destination terminals;

creating a destination list to display identifiers of the destination terminals using the destination list data and the status data, wherein a sequence in which the identifiers are arranged in the destination list is updated when one of the communication statuses is updated;

controlling display of the destination list including the identifiers and display of a cursor at a position in the sequence in which the identifiers are arranged to indicate a current selection of one of the identifiers; and when at least one of the communication statuses is updated causing a change in the sequence in which the identifiers are arranged in the destination list, without a change in the overall position of the displayed destination list on a display screen, automatically selecting one of a first mode and a second mode depending on whether one of the identifiers at a sequence position on the destination list is indicated as currently selected by the cursor in response to a user operation to select the one of the identifiers, the first mode being selected when the user operation to select one of the identifiers by the cursor has not occurred, and the second mode being selected when the user operation to select one of the identifiers by the cursor has occurred, wherein in the first mode, the method includes maintaining the cursor at the sequence position within the destination list when a change in a sequence position of the selected one of the identifiers occurs when the sequence is updated based on the update of at least one of the communication statuses, and in the second mode, the method includes automatically moving the cursor from the sequence position to a new sequence position within the destination list at which the selected one of the identifiers is placed even when a change in a sequence position of the selected one of the identifiers occurs when the sequence is updated based on the update of at least one of the communication statuses.

* * * * *